(12) United States Patent
Kusayanagi

(10) Patent No.: US 7,359,389 B2
(45) Date of Patent: Apr. 15, 2008

(54) PACKET SWITCH FOR INTERFACING BETWEEN LAN AND WAN

(75) Inventor: Michio Kusayanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1032 days.

(21) Appl. No.: 10/116,274

(22) Filed: Apr. 4, 2002

(65) Prior Publication Data

US 2003/0123462 A1 Jul. 3, 2003

(30) Foreign Application Priority Data

Dec. 28, 2001 (JP) ............................. 2001-399220

(51) Int. Cl.
*H04L 12/56* (2006.01)
(52) U.S. Cl. ..................... 370/401; 370/389; 370/428
(58) Field of Classification Search .................. 370/393
See application file for complete search history.

(56) References Cited

U.S. PATENT DOCUMENTS

| | | | | |
|---|---|---|---|---|
| 5,720,032 A | * | 2/1998 | Picazo et al. ................ | 709/250 |
| 5,848,242 A | * | 12/1998 | Behaghel et al. ............ | 709/218 |
| 5,982,741 A | * | 11/1999 | Ethier .......................... | 370/201 |
| 6,289,015 B1 | * | 9/2001 | Warner et al. ............... | 370/392 |
| 6,621,818 B1 | * | 9/2003 | Szczepanek et al. ........ | 370/389 |
| 6,674,756 B1 | * | 1/2004 | Rao et al. ............... | 370/395.21 |
| 6,741,566 B1 | * | 5/2004 | Furlong et al. .............. | 370/236 |
| 2002/0196802 A1 | * | 12/2002 | Sakov et al. ................ | 370/432 |

* cited by examiner

*Primary Examiner*—Chi Pham
*Assistant Examiner*—Kevin Mew
(74) *Attorney, Agent, or Firm*—Katten Muchin Rosenman LLP

(57) ABSTRACT

A packet switch interfacing between a WAN and a LAN accommodating a terminal includes an address table storing a relation between an address of the terminal and an input port receiving a packet transmitted from the terminal, and an address learning unit for storing in the address table the relation between the source address of the received packet and the input port receiving the received packet. Further the packet switch includes a SW unit for effecting control to transmit the received packet according to whether or not stored in the address table, and then transmit the received packet to the WAN when a packet having a source address identical with the destination address of the received packet has not been received from the LAN.

7 Claims, 20 Drawing Sheets

FIG.20

| No | PACKET INPUT PORT | LEARNING STATE | OPERATION |
|---|---|---|---|
| 1 | 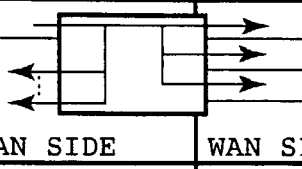 LAN SIDE / WAN SIDE | NOT LEARNED | FLOODING ALL PORT OTHER THAN INPUT LAN PORT |
| 2 | 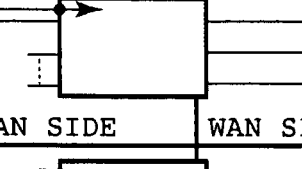 LAN SIDE / WAN SIDE | LEARNED | DISCARD |
| 3 | 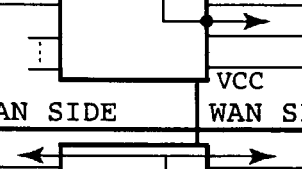 LAN SIDE / WAN SIDE | LEARNED WAN SIDE PORT | FORWARDING TO CORRESPONDING WAN PORT |
| 4 | 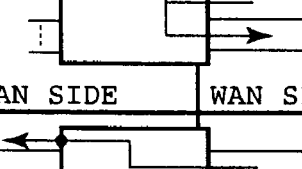 LAN SIDE / WAN SIDE | NOT LEARNED | FLOODING ALL PORTS OTHER THAN INPUT WAN PORT |
| 5 | 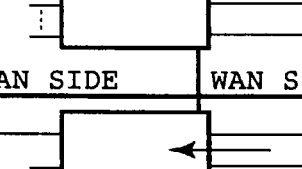 LAN SIDE / WAN SIDE | LEARNED | FLOODING TO LAN PORT |
| 6 | 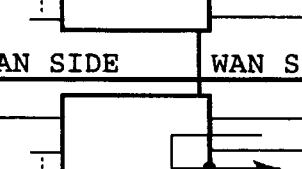 LAN SIDE / WAN SIDE | LEARNED SAME WAN SIDE PORT AS INPUT PORT | DISCARD |
| 7 | 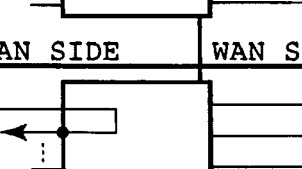 LAN SIDE / WAN SIDE | LEARNED WAN SIDE PORT DIFFERENT FROM INPUT PORT | FLOODING TO CORRESPONDING WAN PORT |
| 8 | 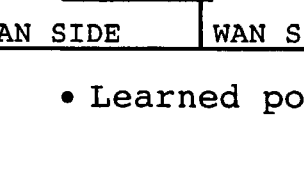 LAN SIDE / WAN SIDE | LEARNED | FLOODING TO CORRESPONDING LAN PORT |

• Learned port

PACKET SWITCH FOR INTERFACING BETWEEN LAN AND WAN

BACKGROUND OF THE INVENTION

1. Field of the Invention

The present invention relates to a packet switch for forwarding a packet to a WAN side and a LAN side.

2. Description of the Related Art

There has been an increase in methods that construct an intra-company wide-area LAN by connecting bases of a company to each other via WAN lines and disposing a MAC packet switch at an entry to each of the bases. FIG. 19 is a diagram showing an example of a constructed intra-company wide-area LAN. As shown in FIG. 19, an office LAN 2#i (i=1, 2, . . . ) accommodating terminals such as of personal computers is connected to a MAC packet switch (SW) 4#i (i=1, 2, . . . ). In this case, a LAN side interface of the SW 4#i is an Ether or the like. The SW 4#i has a plurality of lines on a WAN 6 side. An interface of the SW 4#i with the WAN 6 side is MAC over ATM for allowing MAC packets to be contained in ATM cells, or the like. The SWs 4#i (i=1, 2, . . . ) of the bases are connected to each other on the WAN 6 side by a mesh, a ring or the like. The SW 4#i operates as a MAC packet bridge having an address learning function.

When a MAC packet is inputted from the office LAN 2#i, the SW 4#i registers, in a learning table, the source MAC address (source address) of the packet such that the source MAC address is associated with a port where the packet is inputted, thereby learning the MAC address. In addition, the SW 4#i constructs a packet from an ATM cell inputted to a WAN port connected to a WAN line, and then registers, in the learning table, the source MAC address (source address) of the packet such that the source MAC address is associated with the input port, thereby learning the MAC address. When receiving a MAC packet from the office LAN 2#i, the SW 4#i searches the learning table using the destination MAC address (destination address) of the packet, and then performs the following operation. FIG. 20 is a diagram showing packet forwarding patterns.

(i) When the destination address of the packet has already been learned, and a port corresponding to the destination address is not the input port of the packet and is a LAN port, the SW 4#i forwards the packet only to the corresponding port as shown in No. 8 in FIG. 20.

(ii) When the destination address of the packet has already been learned, and a port corresponding to the destination address is not the input port of the packet and is a WAN port, the SW 4#i converts the packet into an ATM cell, and then forwards the ATM cell to the corresponding WAN port as shown in No. 3 in FIG. 20.

(iii) When the destination address of the packet has already been learned, and a port corresponding to the destination address is the same as the input port of the packet, the SW 4#i discards the packet as shown in No. 2 in FIG. 20.

(iv) When the destination address of the packet has not been learned, the SW 4#i forwards the packet to all ports accommodating LAN interfaces other than the input port of the packet and to ports on the WAN 6 side as shown in No. 1 in FIG. 20.

Also for a packet inputted to an input port connected to the WAN 6 side, the SW 4#i searches the learning table using the destination address of the packet, and then performs the following operation.

(i) When the destination address of the packet has already been learned, and a port corresponding to the destination address is not the input port of the packet and is a LAN port, the SW 4#i forwards the packet to only the corresponding port as shown in No. 5 in FIG. 20.

(ii) When the destination address of the packet has already been learned, and a port corresponding to the destination address is not the input port of the packet and is a WAN port, the SW 4#i forwards the packet to the corresponding WAN port as shown in No. 7 in FIG. 20.

(iii) When a port corresponding to the destination address of the packet is the same as the input port of the cell, the SW 4#i discards the packet as shown in No. 6 in FIG. 20.

(iv) When the destination address of the packet has not been learned, the SW 4#i forwards the packet to the LAN side ports and the WAN 6 side ports other than the input port of the packet as shown in No. 4, in FIG. 20.

A broadcast packet is not learned and is forwarded to all the ports at all times. The conventional switch, however, has the following problem. Since lines on the WAN side are expensive, it is desirable to reduce traffic as much as possible. When a packet whose address has not been learned and a broadcast packet flows on the WAN side having a loop configuration, packets at the SW 4#i increase, whereby the entire network is paralyzed by congestion. There is a method for preventing this, which forces a line in a loop state to be disabled using a spanning tree protocol (STP). However, this method lets an expensive WAN line idle, and therefore is not economical.

SUMMARY OF THE INVENTION

It is accordingly an object of the present invention to provide a switch that can reduce the traffic of WAN lines without letting the WAN lines idle.

In accordance with an aspect of the present invention, there is provided a packet switch for interfacing between a WAN and a LAN accommodating a terminal, the packet switch includes an address table for storing a relation between an address of the terminal and an input port receiving a packet transmitted from the terminal, an address learning unit for storing in the address table the relation between the source address of the received packet and the input port receiving the received packet, and an SW unit for effecting control to transmit the received packet to a corresponding output port according to a relation between a destination address of the received packet and the input port when the destination address is stored in the address table, and effecting control to transmit the received packet to the LAN when the destination address of the received packet is not stored in the address table, and then transmit the received packet to the WAN when a packet having a source address identical with the destination address of the received packet has not been received from the LAN in a certain time after transmitting the received packet to the LAN.

In accordance with another aspect of the present invention, there is provided a packet switch for interfacing between a WAN and a LAN accommodating a terminal, the packet switch includes an address table for storing a correspondence between an address of the terminal and an input port receiving a packet transmitted from the terminal, an address learning unit for not storing. in the address table a source address of a packet received from the WAN when the source address is stored in the address table and an input port corresponding to the source address is on the LAN side, and otherwise storing in the address table a relation between a source address of a packet received from the LAN or the WAN and an input port receiving the packet, an aging processing unit for deleting each of the addresses from the address table when there has been no update relating to the address in a certain time, and an SW unit for effecting control to transmit the packet received from the LAN side to a corresponding output port according to a relation between a destination address of the packet and the input port when the destination address is stored in the address table, and discarding the packet received from the WAN side when the source address of the packet is stored in the address table and the input port corresponding to the source address of the packet is on the LAN side.

In accordance with a further aspect of the present invention, there is provided a packet switch for interfacing between a WAN and a LAN accommodating a terminal, the packet switch includes an address table for storing a relation between an address of the terminal and an input port receiving a packet transmitted from the terminal, an address learning unit for storing in the address table a relation between a source address of a packet received from the LAN or the WAN and an input port receiving the packet, a temporary storage memory; and an SW unit for effecting control to transmit the packet to a corresponding output port according to a relation between a destination address of the packet and the input port when the destination address of the packet is stored in the address table, storing information on a received packet received from the LAN in the temporary storage memory when the received packet is transmitted to the WAN, and discarding a received packet received from the WAN side when information on the received packet coincides with the information stored in the temporary storage memory.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 20 is a diagram showing packet forwarding patterns.

DETAILED DESCRIPTION OF THE PREFERRED EMBODIMENTS

Figure 1:
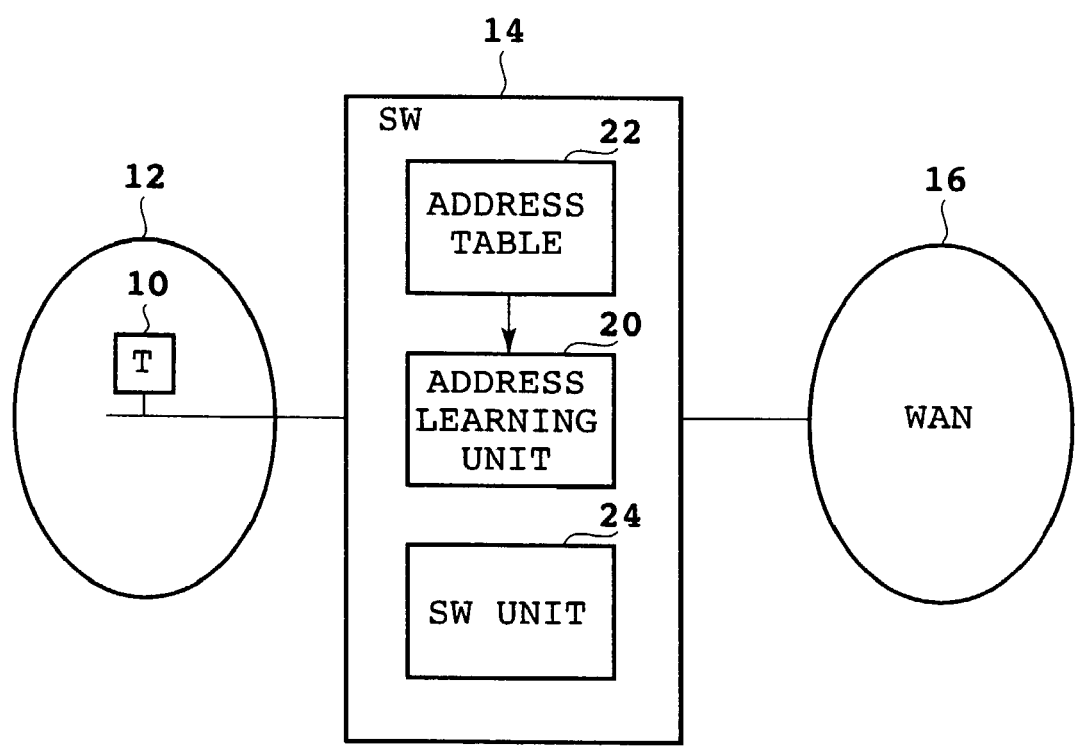
FIG. 1 is a diagram of assistance in explaining principles of the present invention.

Principles of the present invention will be described prior to description of embodiments of the present invention. FIG. 1 is a diagram of assistance in explaining principles of the present invention. As shown in FIG. 1, a packet switch 14 for interfacing between a LAN 12 accommodating terminals 10 and a WAN 16 is provided with an address table 20, an address learning unit 22, and an SW unit 24. The address table 20 stores a relation between an address of a terminal 10 accommodated in the LAN 12 or a terminal not shown in the figure accommodated in the WAN 16 and an input port that receives a packet transmitted from the terminal 10 or the like. The address learning unit 22 stores in the address table 20 the relation between the source address of the packet received from the LAN 12 or the WAN 16 and the input port receiving the packet.

When a destination address of a packet is stored in the address table 20, the SW unit 24 effects control to transmit the packet to a corresponding output port according to a relation between the destination address and the input port. When the destination address of the packet is not stored in the address table 20, the SW unit 24 transmits the packet to the LAN 12. When a terminal 10 having an address that coincides with the destination address set in the packet is accommodated in the LAN 12, the terminal 10 receives the packet, and then transmits to the LAN 12 an acknowledging packet formed by setting the source address of the received packet as a destination address and the address of the terminal itself as a source address. When a terminal 10 having an address that coincides with the destination address set in the packet is not present, however, no acknowledging packet is transmitted to the LAN 12. When a packet having a source address identical with the destination address of the packet transmitted to the LAN 12 is not received, the SW unit 24 effects control to transmit the packet to the WAN 16 side. Thus, when the destination address of the packet is not learned, the packet is first transmitted to the LAN 12 side, rather than simultaneously flooding the LAN 12 side and the WAN 16 side with the packet, and then the packet is transmitted to the WAN 16 side when a packet having a source address identical with the destination address of the packet is not received from the LAN 12. It is therefore possible to control an increase in traffic due to the flooding of the WAN 16 with the packet.

First Embodiment

Figure 2:
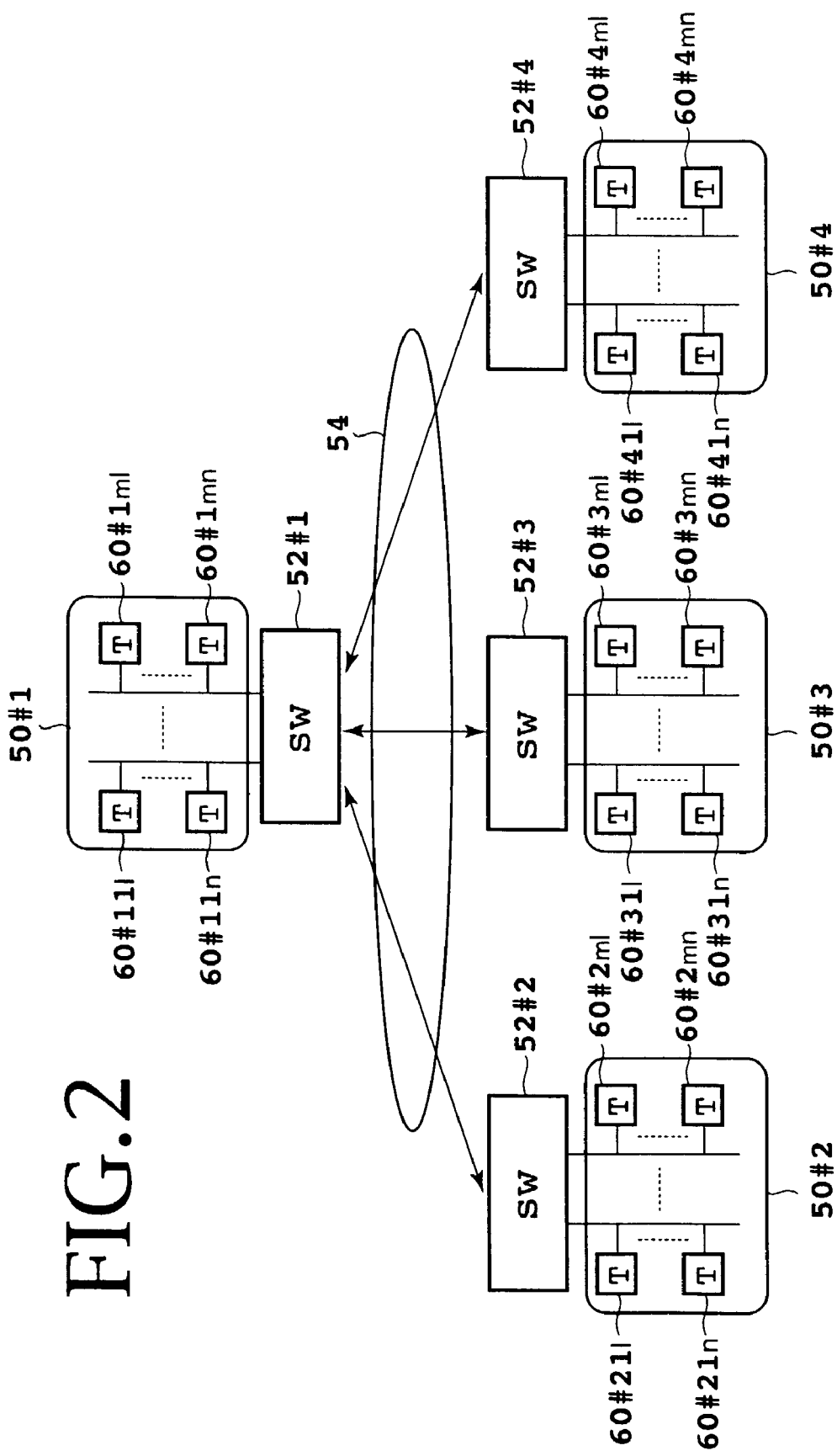
FIG. 2 is a diagram of a network configuration according to a first embodiment of the present invention.

FIG. 2 is a diagram of a network configuration according to a first embodiment of the present invention. As shown in FIG. 2, the network comprises a plurality of office LANs 50#i (i=1, 2, ...), a plurality of SWs 52#i (i=1, 2, ...), and a WAN 54. The office LANs 50#i are LANs such as Ether networks, and each connected to a plurality of ports of an SW 52#i by a plurality of Ether cables. The office LANs 50#i each include a plurality of terminals 60#ijk (j=1, 2, ..., m, and k=1, 2, ...). A terminal 60#ijk is a PC or the like, and transmits and receives MAC frames (hereinafter referred to as packets) via an Ether interface. When the terminal 60#ijk receives a packet directed to the terminal itself, the terminal 60#ijk returns an acknowledging packet formed by setting the source address of the received packet as a destination address and the MAC address of the terminal itself as a source address according to an ARP protocol, for example.

Figure 3:
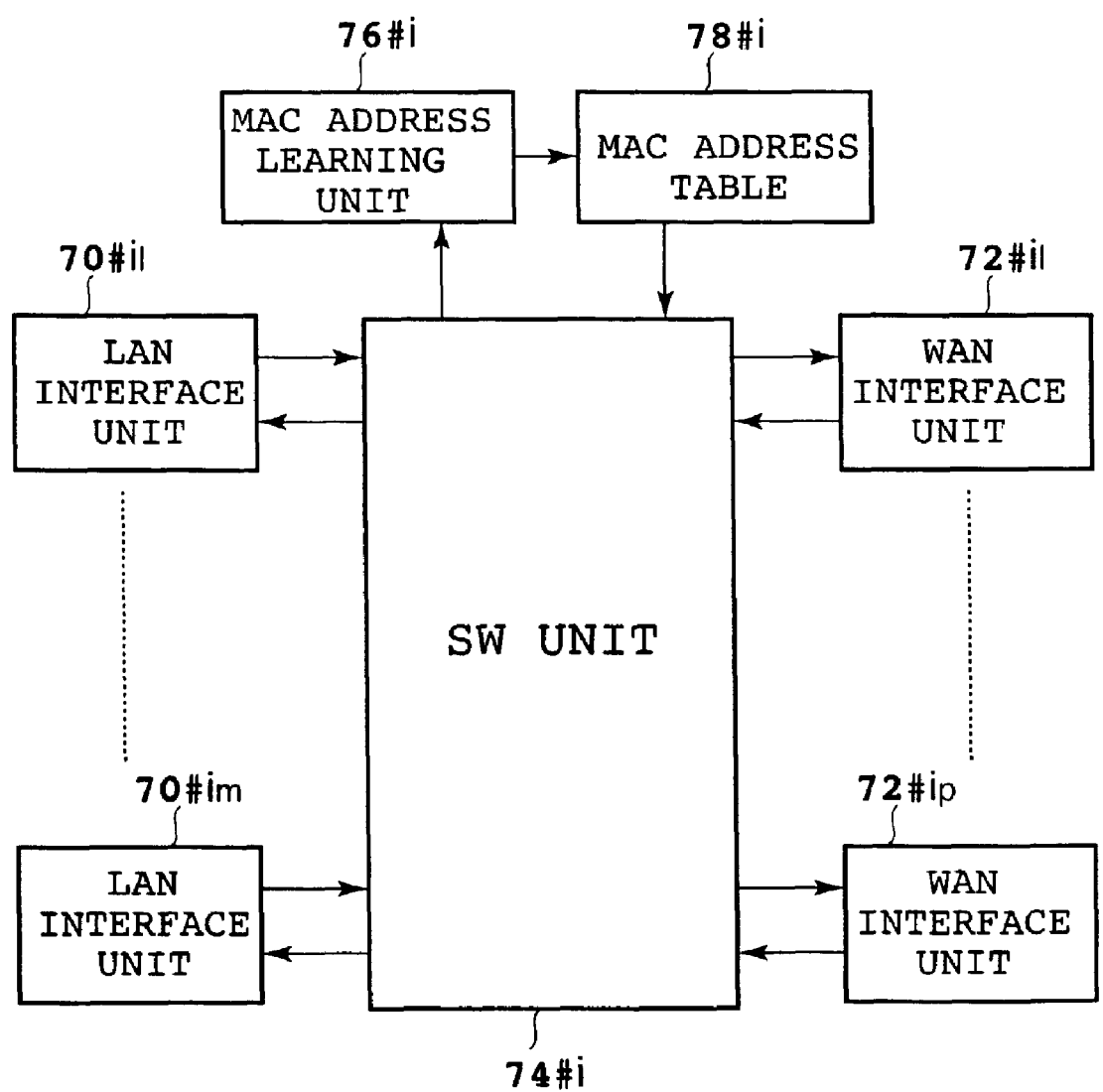
FIG. 3 is a block diagram of an SW in FIG. 2.

FIG. 3 is a block diagram of an SW 52#i in FIG. 2. As shown in FIG. 3, the SW 52#i has a plurality of LAN interface units 70#ij (j=1, 2, . . . , m), a plurality of WAN interface units 72#il (l=1, 2, . . . , p), an SW unit 74#i, a MAC address learning unit 76#i, and a MAC address table 78#i. The LAN interface units 70#ij have the following functions. (1) To receive a packet from the office LAN 50#i and then output the packet to the SW unit 74#i. (2) To receive a packet from the SW unit 74#i and then transmit the packet to the office LAN 50#i. The WAN interface units 72#il (l=1, 2, . . . , p) have the following functions. (1) To receive ATM cells, SONET frames, ISDN packets and the like conforming to the WAN interface from the WAN 54 side. (2) To construct received packets of the WAN interface into Ether packets and then output the Ether packets to the SW unit 74#i. (3) To put Ether packets outputted from the SW unit 74#i into packets of the WAN interface and then transmit the packets to the WAN 54.

Figure 4:
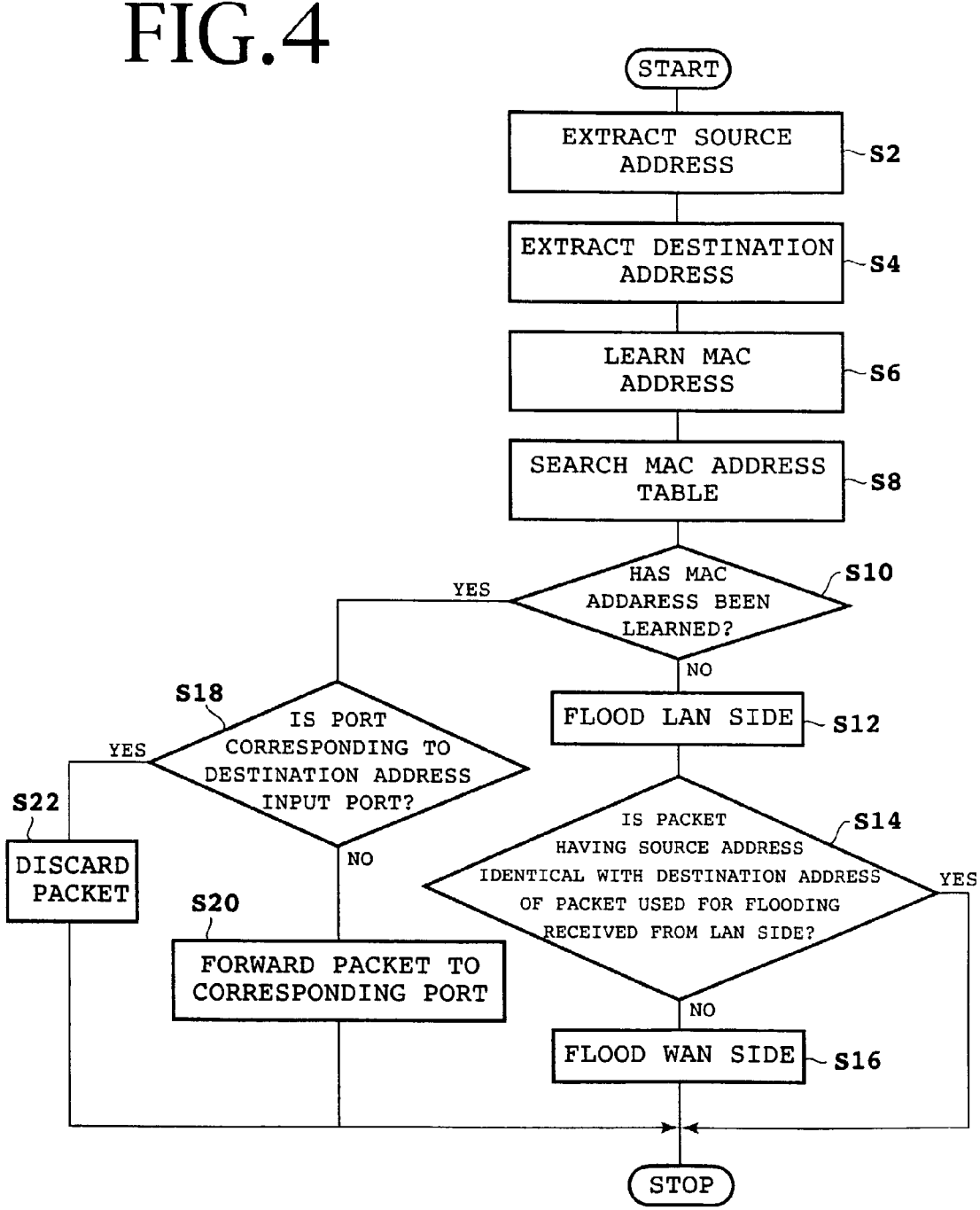
FIG. 4 is a flowchart of operation of an SW unit in FIG. 3.

FIG. 4 is a flowchart of operation of the SW unit 74#i. The SW unit 74#i receives a packet from a LAN interface unit 70#ij or a WAN interface unit 72#il, and then performs the following processing. At a step S2, the SW unit 74#i extracts a source address of the packet. At a step S4, the SW unit 74#i extracts a destination address of the packet. At a step S6, the SW unit 74#i outputs the source address of the packet and an input port number to the MAC address learning unit 76#i, and provides an instruction to learn the MAC address. At a step S8, the SW unit 74#i searches the MAC address table 78#i for the destination address of the packet. At a step S1O, the SW unit 74#i determines whether the MAC address has been learned. When the MAC address has not been learned, the processing proceeds to a step S12. When the MAC address has been learned, the processing proceeds to a step S18.

At the step S12, the SW unit 74#i floods the office LAN 50#i with the packet through LAN interface units other than the LAN/WAN interface unit connected to the port to which the packet has been inputted. The LAN side is first flooded, and when a packet having a source address identical with the destination address of the packet used for the flooding has not been received, the WAN side is flooded to thereby control an increase in traffic on the WAN side. At a step S14, the SW unit 74#i determines whether a packet having a source address identical with the destination address of the packet used for the flooding is received from the office LAN 50#i. When a packet having a source address identical with the destination address of the packet used for the flooding is not received, the processing proceeds to a step S16. Whether a packet having a source address identical with the destination address of the packet used for the flooding is received, is determined on the basis of whether a packet having a source address identical with the destination address of the packet used for the flooding is received before passage of a certain time after the flooding of the office LAN 50#i with the packet. When a packet having a source address identical with the destination address of the packet used for the flooding is received, the processing is ended. At the step S16, the SW unit 74#i outputs the packet to WAN interface units other than the WAN interface unit that has received the packet.

At the step S18, the SW unit 74#i determines whether a port corresponding to the destination address is the input port of the packet. When the corresponding port is different from the input port, the processing proceeds to a step S20. When the corresponding port is the same as the input port, the processing proceeds to a step S22. At the step S20, the SW unit 74#i outputs the packet to a LAN interface unit or a WAN interface unit connected to the corresponding output port. At the step S22, the SW unit 74#i discards the packet.

Figure 5:
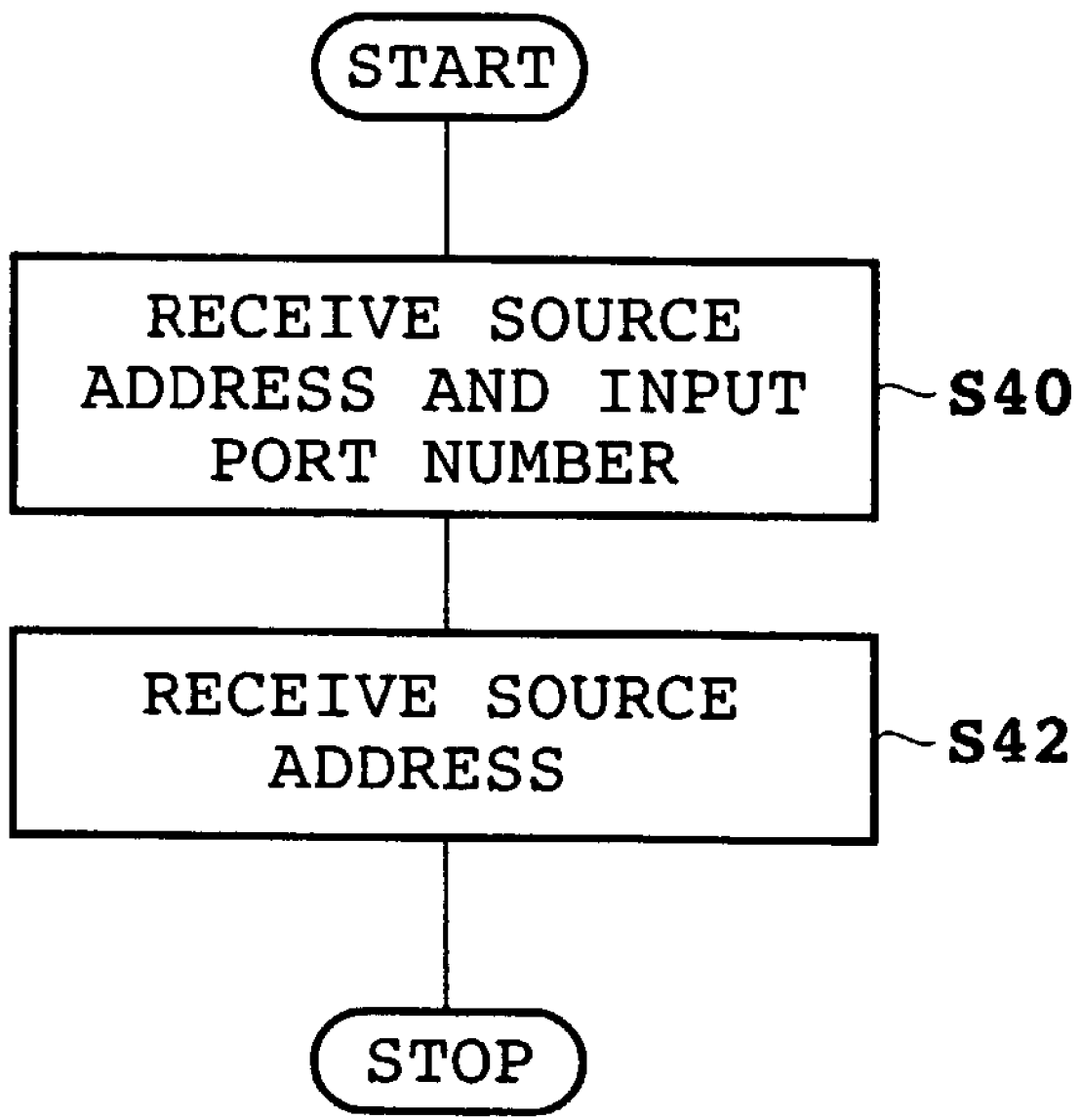
FIG. 5 is a flowchart of operation of a MAC address learning unit in FIG. 3.

FIG. 5 is a flowchart of operation for address learning of the MAC address learning unit 76#i. The MAC address learning unit 76#i performs the following processing for address learning. At a step S40, the MAC address learning unit 76#i receives the source address of a packet and an input port number from the SW unit 74#i. At a step S42, the MAC address learning unit 76#i registers the source address, the input port number, and a present time in the MAC address table 78#i.

The time is registered for aging. Aging deletes the MAC address of a terminal that has not transmitted a packet in a certain time from the MAC address table 78#i to thereby deal with a change in a relation between the MAC address and the port due to movement of the terminal or the like. The MAC address learning unit 76#i also deletes a MAC address that predates a certain time which address is registered in the MAC address table 78#i (aging). The MAC address table 78#i stores the source address, the input port number, and the latest registered time. The WAN 54 in FIG. 2 is a wide area network. An interface for the WAN 54 is MAC OVER ATM, ISDN, SONET, Frame Relay or the like. While the WAN 54 is of a star configuration in the first embodiment, the WAN 54 may be of a different configuration.

Operation of FIG. 2 will be described in the following.
(1) Communication within office LAN 50#1

Suppose that a terminal 60#111 sends a packet having the MAC address of the terminal as a source address and the MAC address of a terminal 60#121 as a destination address to the office LAN 50#1. The LAN interface unit 70#11 in the SW 52#1 receives the packet, and then outputs the packet to the SW unit 74#1. The SW unit 74#1 sends the source address of the packet and an input port number to the MAC address learning unit 76#1. The MAC address learning unit 76#1 registers the source address, the input port number, and a present time in the MAC address table 78#1. The SW unit 74#1 searches the MAC address table 78#1 for the destination address of the packet to determine whether the destination address has been learned. When the destination address has been learned, the SW unit 74#1 forwards the packet to the office LAN 50#1 through the LAN interface unit 70#12 connected to a port corresponding to the destination address. When the destination address has not been learned, the SW unit 74#1 floods the office LAN 50#1 with the packet through the LAN interface units 70#1j (j=2, . . . , m) other than the LAN interface unit 70#11, and then waits for an acknowledgment for a certain period of time.

The terminal 60#121 receives the packet directed to the terminal itself, and then transmits to the office LAN 50#1 an acknowledging packet formed by setting the MAC address of the terminal itself as a source address and the source address of the packet as a destination address in accordance with the ARP protocol. The LAN interface unit 70#12 receives the acknowledging packet, and then outputs the acknowledging packet to the SW unit 74#1. Since the source address of the acknowledging packet coincides with the destination address of the packet transmitted to the office LAN 50#1, the SW unit 74#1 discards the packet from the terminal 60#111. Thus, when the packet is received in the office LAN 50#1, the WAN 54 is not flooded with the packet, which makes it possible to control an increase in traffic in the WAN 54 due to the flooding. Since the destination address of the acknowledging packet is learned by the MAC address table 78#1, the SW unit 74#1 sends the acknowledging packet to the office LAN 50#1 through the LAN interface unit 70#11. In addition, the source address of the acknowledging packet is learned by the MAC address table 78#1.

(2) Communication between office LAN 50#1 and office LAN 50#3

Suppose that the terminal 60#111 sends a packet having the MAC address of the terminal as a source address and the MAC address of a terminal 60#311 as a destination address to the office LAN 50#1. The LAN interface unit 70#11 in the SW 52#1 receives the packet, and then outputs the packet to the SW unit 74#1. The SW unit 74#1 sends the source address of the packet and an input port number to the MAC address learning unit 76#1. The MAC address learning unit 76#1 registers the source address and the input port number in the MAC address table 78#1. The SW unit 74#1 searches the MAC address table 78#1 for the destination address of the packet to determine whether the destination address has been learned. When the destination address has been learned, the SW unit 74#1 forwards the packet to the WAN 54 side through a WAN interface unit connected to a port corresponding to the destination address.

When the destination address has not been learned, the SW unit 74#1 floods the office LAN 50#1 with the packet through the LAN interface units 70#1j (j=2, . . . , m) other than the LAN interface unit 70#11, and then waits for an acknowledgment for a certain period of time. Since the terminal 60#311 is not accommodated in the office LAN 50#1, the SW 52#1 cannot receive a packet having a source address identical with the destination address of the above packet. The SW unit 74#1 floods the WAN 54 side with the packet through all the WAN interface units 72#il (l=1, 2, . . . ).

The SW 52#2 or the SW 52#4 receives the packet from the WAN 54, and then searches the MAC address table 78#2 or the MAC address table 78#4 for the destination address of the packet to determine whether the destination address has been learned. When the destination address has not been learned, the SW 52#2 or the SW 52#4 transmits the packet to the office LAN 50#2 or the office LAN 50#4. Since the terminal 60#311 corresponding to the destination address is not accommodated in the office LAN 50#2 or the office LAN 50#4, an acknowledging packet is not returned from the office LAN 50#2 or the office LAN 50#4. However, since the packet is inputted to one interface with the SW 52#1 on the WAN 54 side, the SW 52#2 or the SW 52#4 does not flood the WAN 54 side with the packet, but discards the packet. The SW 52#2 or the SW 52#4 learns the source address of the packet.

The SW 52#3 receives the packet from the WAN 54, and then searches the MAC address table 78#3 for the destination address of the packet to determine whether the destination address has been learned. When the destination address has not been learned, the SW 52#3 transmits the packet to the office LAN 50#3. Since the terminal 60#311 corresponding to the destination address is accommodated in the office LAN 50#3, the terminal 60#311 receives the packet from the office LAN 50#3, and then returns an acknowledging packet. When the SW 52#3 receives the acknowledging packet, the SW 52#3 discards the packet received from the SW 52#1. The acknowledging packet is received by the SW 52#1 via the WAN 54. When the SW 52#1 receives the acknowledging packet, the SW 52#1 transmits the acknowledging packet to the office LAN 50#1. Also, the SW 52#1 learns the source address of the acknowledging packet in the same manner as a normal packet. It is to be noted that while the first embodiment takes an example of not throwing the packet received from the LAN to the WAN, a concept similar to this may be applied so that in a state with a plurality of WAN ports, a packet from the WAN is first thrown to the LAN side, and the packet is not thrown to the other WAN ports when a packet having a source address identical with the destination address of the packet thrown to the LAN side is received from the LAN side.

Second Embodiment

Figure 6:
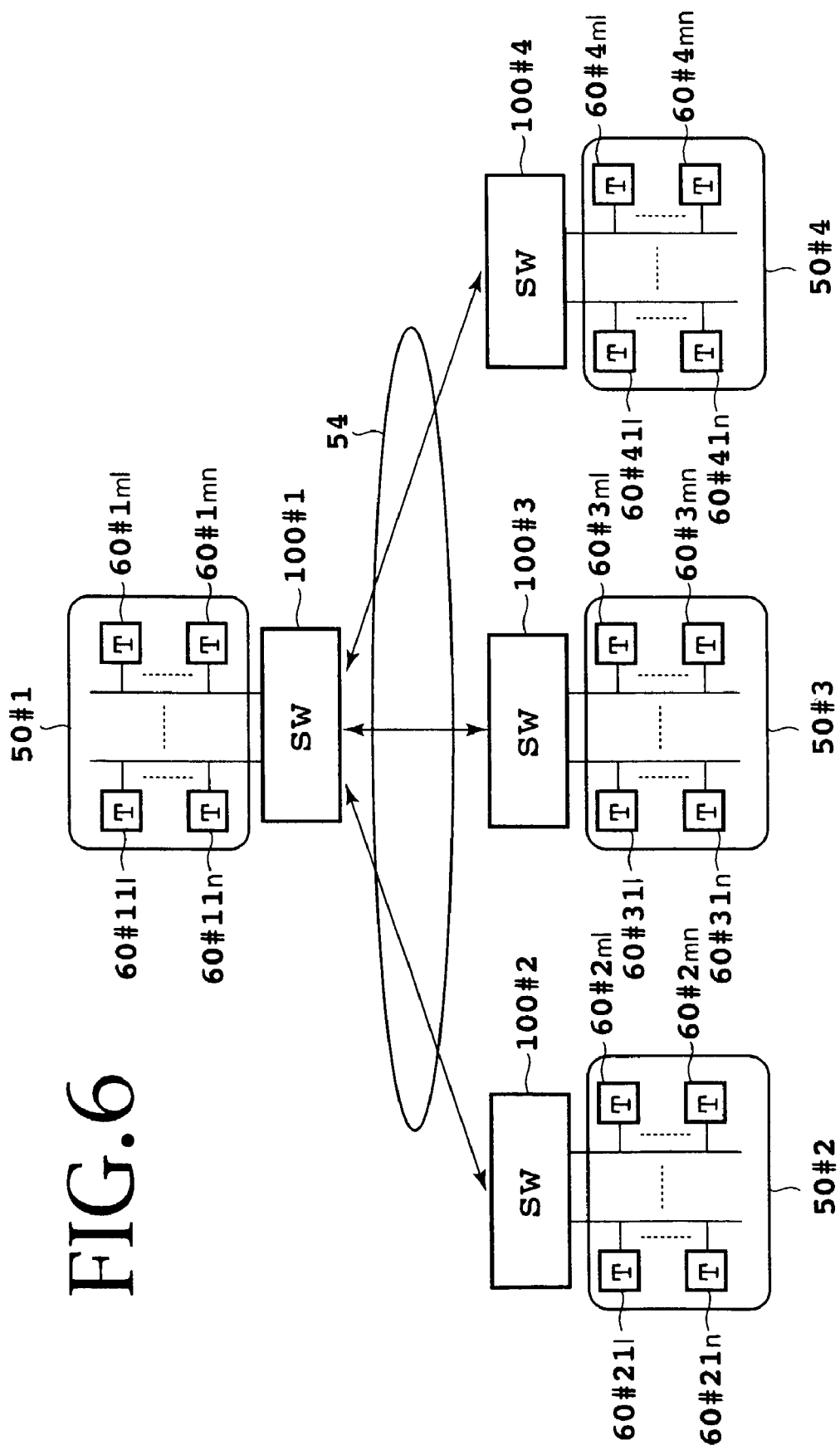
FIG. 6 is a diagram of a network configuration according to a second embodiment of the present invention.

FIG. 6 is a diagram of a network configuration according to a second embodiment of the present invention. In the figure, substantially the same components as the components in FIG. 2 are identified by the same reference numerals. When flooding a WAN 54 side with a packet, an SW 100#i according to the second embodiment selects one of a plurality of WAN lines, and then transmits the packet to the WAN line. When a packet having a source address identical with the destination address of the packet transmitted to the WAN line is not received, the SW 100#i selects one of the other WAN lines, and then transmits the packet to the WAN line. The SW 100#i repeats the operation until a packet having a source address identical with the destination address of the packet transmitted to a WAN line is received. A case for flooding the WAN 54 side is similar to the case in the first embodiment, that is, a case where the destination MAC address is not learned and after the office LAN 50#i is flooded with the packet, a packet having a source address identical with the destination address of the packet used for the flooding is not received.

Figure 7:
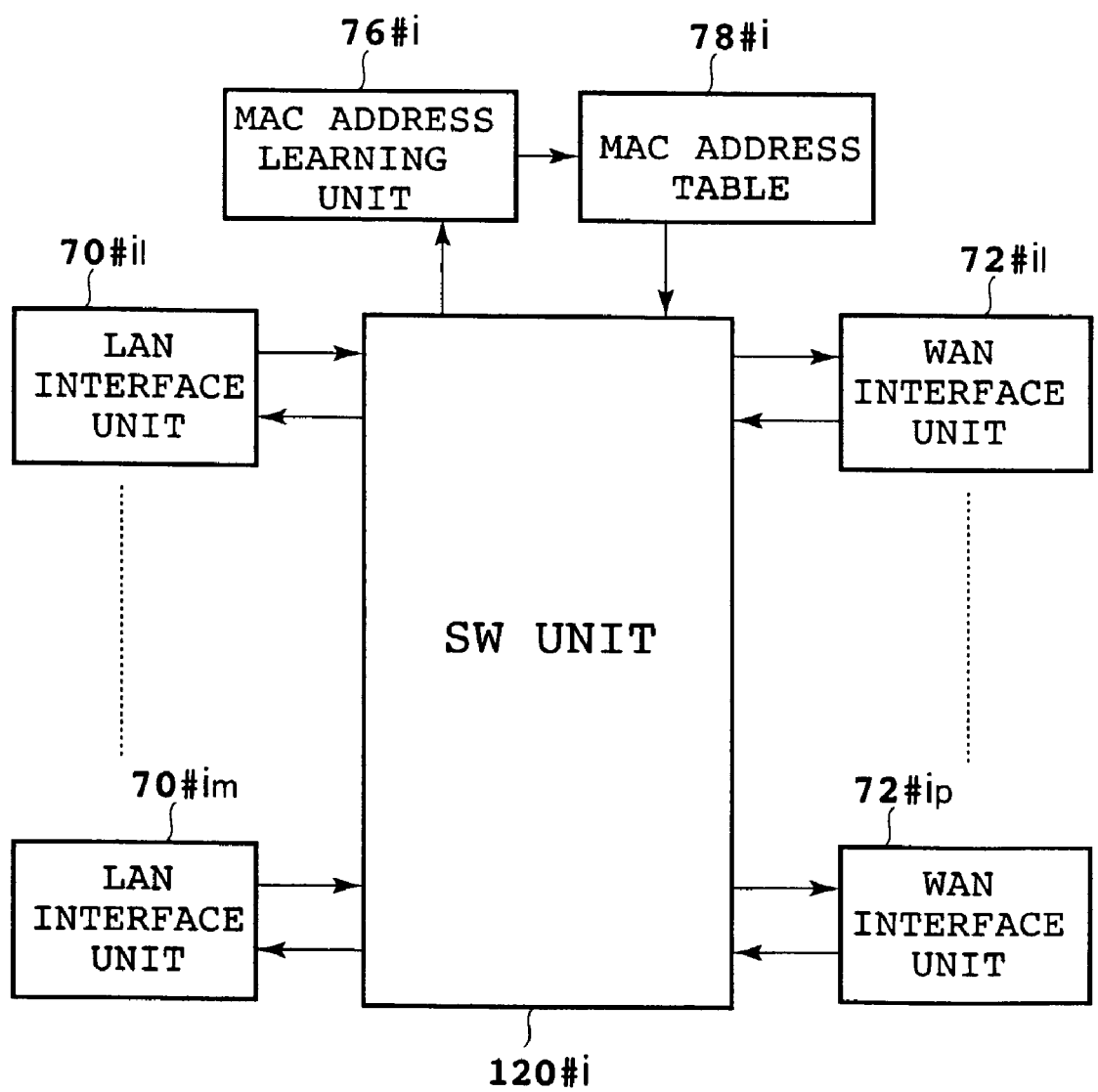
FIG. 7 is a block diagram of an SW in FIG. 6.
Figure 8:
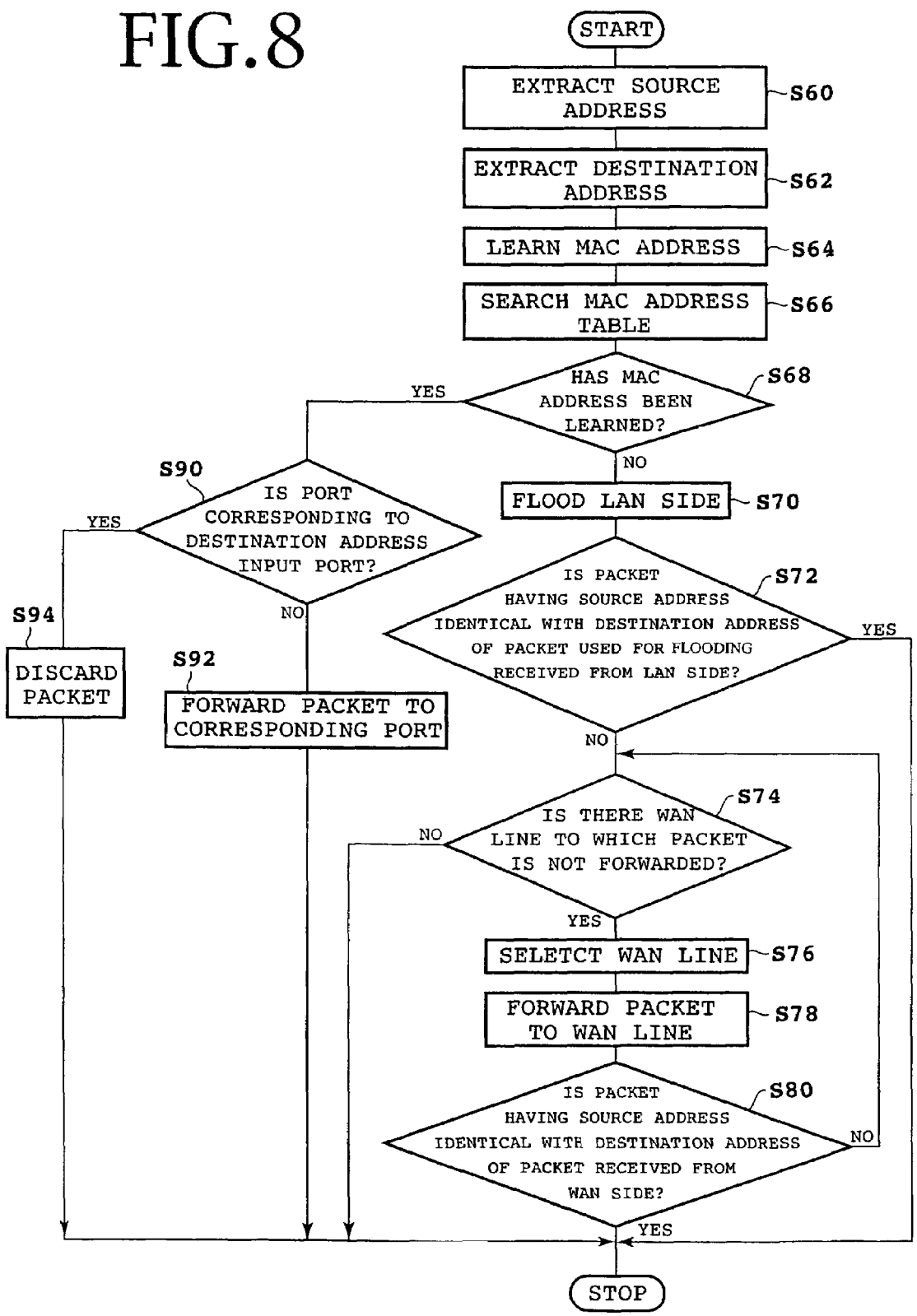
FIG. 8 is a flowchart of operation of an SW unit in FIG. 7.

FIG. 7 is a block diagram of an SW 100#i in FIG. 6. In the figure, substantially the same components as the components in FIG. 3 are identified by the same reference numerals. FIG. 8 is a flowchart of operation of an SW unit 120#i in FIG. 7. The SW unit 120#i receives a packet from a LAN interface unit 70#ij or a WAN interface unit 72#il, and then performs the following processing. Processing of steps S60 to S72 and steps S90 to S94 is the same as processing of the steps S2 to S14 and the steps S18 to S22 in FIG. 4. At a step S74, the SW unit 120#i determines whether there is a WAN line to which the packet is not forwarded. When there is a WAN line to which the packet is not forwarded, the processing proceeds to a step S76. When there is no WAN line to which the packet is not forwarded, the processing is ended. At the step S76, the SW unit 120#i selects a WAN line. The WAN line is selected on the basis of priorities of the WAN lines or in ascending order/descending order of the port number, for example. At a step S78, the SW unit 120#i forwards the packet to the selected WAN line. The SW unit 120#i determines whether a packet having a source address identical with the destination address of the packet forwarded to the WAN line is received from the WAN line to which the packet is forwarded. When the packet is received from the WAN line, the processing is ended. When the packet is not received from the WAN line, the processing returns to the step S74 to carry out the steps S74 to S80.

Operation of FIG. 6 will be described in the following. Communication within an office LAN 50#1 is the same as in the first embodiment, and therefore its description will be omitted. Communication between the office LAN 50#1 and an office LAN 50#3 will be described. Suppose that a terminal 60#111 sends a packet having the MAC address of the terminal as a source address and the MAC address of a terminal 60#311 as a destination address to the office LAN 50#1. The LAN interface unit 70#11 in the SW 100#1 receives the packet, and then outputs the packet to the SW unit 120#1. The SW unit 120#1 searches a MAC address table 78#1 for the destination address of the packet to determine whether the destination address has been learned. When the destination address has been learned, the SW unit 120#1 forwards the packet to the WAN 54 side through a WAN interface unit connected to a port corresponding to the destination address. When the destination address has not been learned, the SW unit 120#1 floods the office LAN 50#1 with the packet through LAN interface units 70#1j (j=2, . . . , m) other than the LAN interface unit 70#11, and then waits for an acknowledgment for a certain period of time.

Since the terminal 60#311 is not accommodated in the office LAN 50#1, the SW 100#1 cannot receive a packet having a source address identical with the destination address of the above packet. The SW unit 120#1 selects one of the WAN lines to which WAN interface units 72#1j (j=2, 3, 4) are connected, or for example a WAN line to which the SW 100#2 is connected. The SW unit 120#1 forwards the packet to the WAN 54 to which the SW 100#2 is connected through the WAN interface unit. When receiving the packet directed to the terminal 60#311, the SW 100#2 searches a MAC address table 78#2 for the destination address of the packet to determine whether the destination address has been learned. When the destination address has been learned, a port corresponding to the destination address is learned as a port on the WAN 54 side, but coincides with the input port. Therefore, the packet is discarded. When the destination address has not been learned, the SW 100#2 floods an office LAN 50#2 with the packet. Since the terminal 60#311 is not accommodated in the office LAN 50#2, the SW 100#2 cannot receive a packet having a source address identical with the destination address of the above packet. Since the SW 100#2 is connected only to the SW 100#1 via the WAN 54, however, the SW 100#2 does not flood the WAN line with the packet.

Since the SW 100#1 cannot receive a packet having a source address identical with the destination address of the above packet, the SW 100#1 selects another WAN line, for example a WAN line connected to the SW 100#3. The SW 100#1 forwards the packet to the WAN 54 to which the SW 100#3 is connected through the WAN interface unit. When receiving the packet directed to the terminal 60#311, the SW 100#3 searches a MAC address table 78#3 for the destination address of the packet to determine whether the destination address has been learned. When the destination address has been learned, the SW 100#3 forwards the packet to an office LAN 50#3 through a LAN interface unit 70#31 connected to a port corresponding to the destination address. When the destination address has not been learned, the SW 100#3 floods the office LAN 50#3 with the packet. Receiving the packet, the terminal 60#311 transmits an acknowledging packet to the office LAN 50#3. Receiving the acknowledging packet having a source address identical with the destination address of the packet received by the terminal 60#311, since the SW 100#3 has learned the destination address of the acknowledging packet, the SW 100#3 forwards the acknowledging packet to the SW 100#1 through the WAN 54. Receiving the acknowledging packet, the SW 100#1 forwards the acknowledging packet to the office LAN 50#1, and also discards the packet from the terminal 60#111. Thus, rather than simultaneously flooding the WAN 54 side, a WAN line is selected and flooded. An increase in traffic due to simultaneous flooding is thereby controlled.

Third Embodiment

Figure 9:
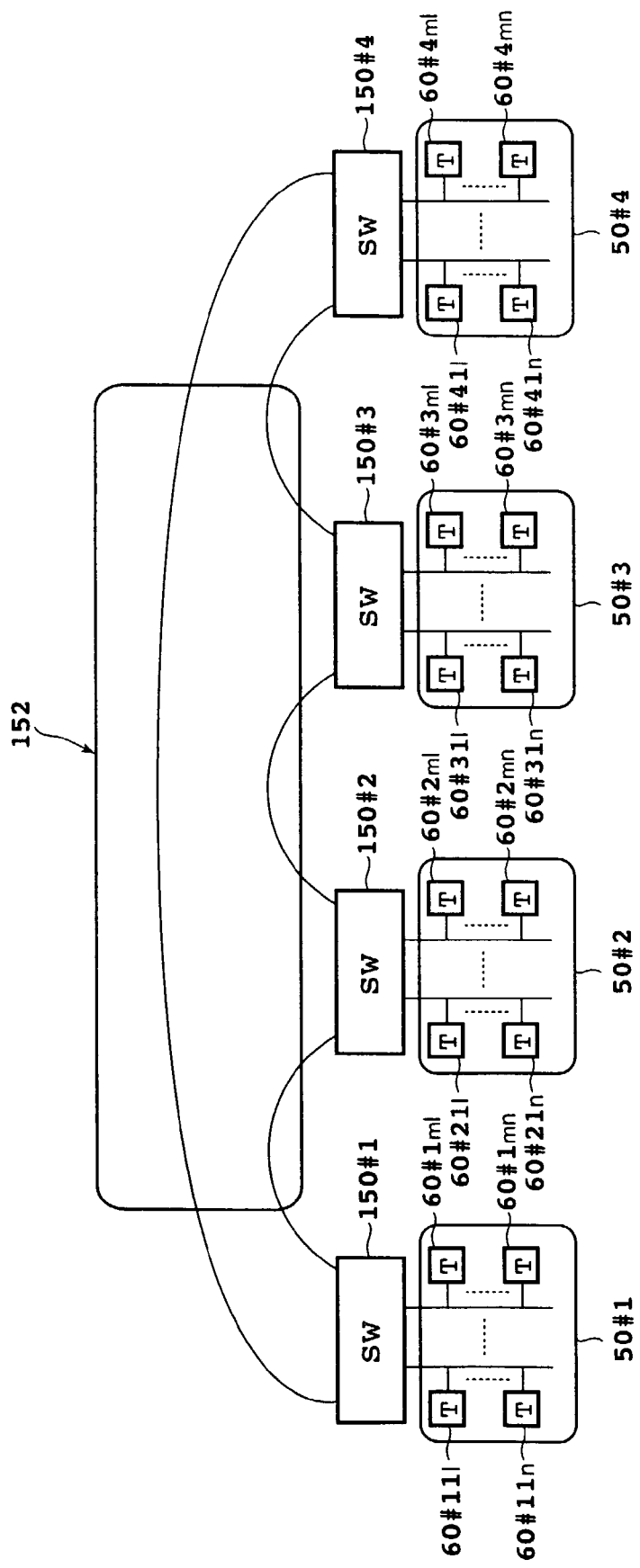
FIG. 9 is a diagram of a network configuration according to a third embodiment of the present invention.

FIG. 9 is a diagram of a network configuration according to a third embodiment of the present invention. In the figure, substantially the same components as the components in FIG. 2 are identified by the same reference numerals. When a WAN 152 has a shape of a ring or the like as shown in FIG. 9, a packet transmitted by an SW 150#i to the WAN 152 side may circulate around the WAN 152 and return to the SW 150#i itself. When such a circulating packet is transmitted to the WAN 152 side again, the packet circulates in the endless loop, thus increasing the traffic of the WAN 152. Accordingly, when the source address of a packet received from the WAN 152 is learned as a source address on a LAN side, the SW 150#i according to the third embodiment determines that the packet is a circulating packet, and then discards the packet. It is to be noted that the third embodiment only takes the shape of a ring as an example of the shape of the WAN 152 that may cause a packet to circulate around, and therefore the WAN 152 may of course be of another shape having a part in the shape of a ring, for example.

Figure 10:
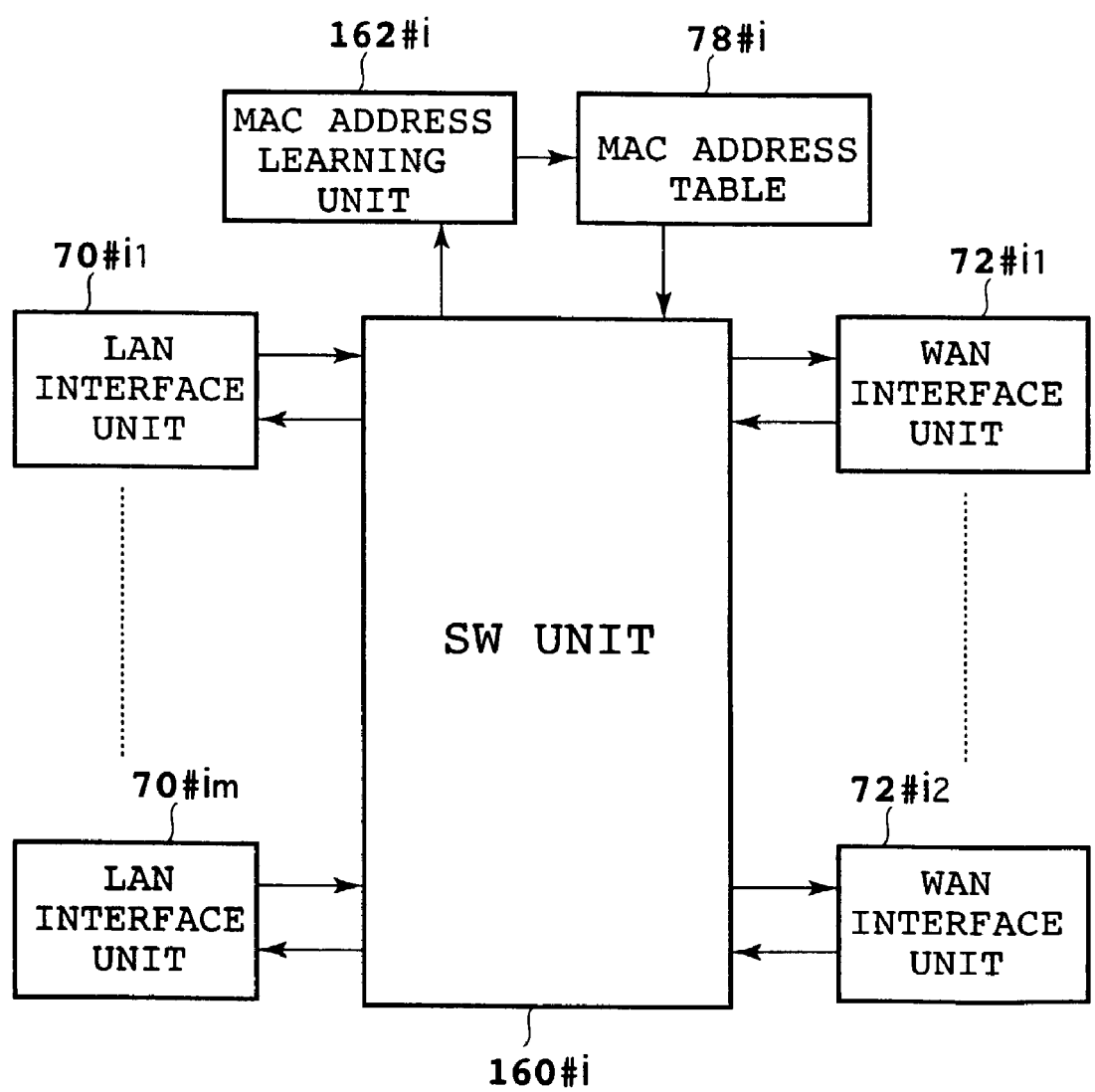
FIG. 10 is a block diagram of an SW in FIG. 9.
Figure 11:
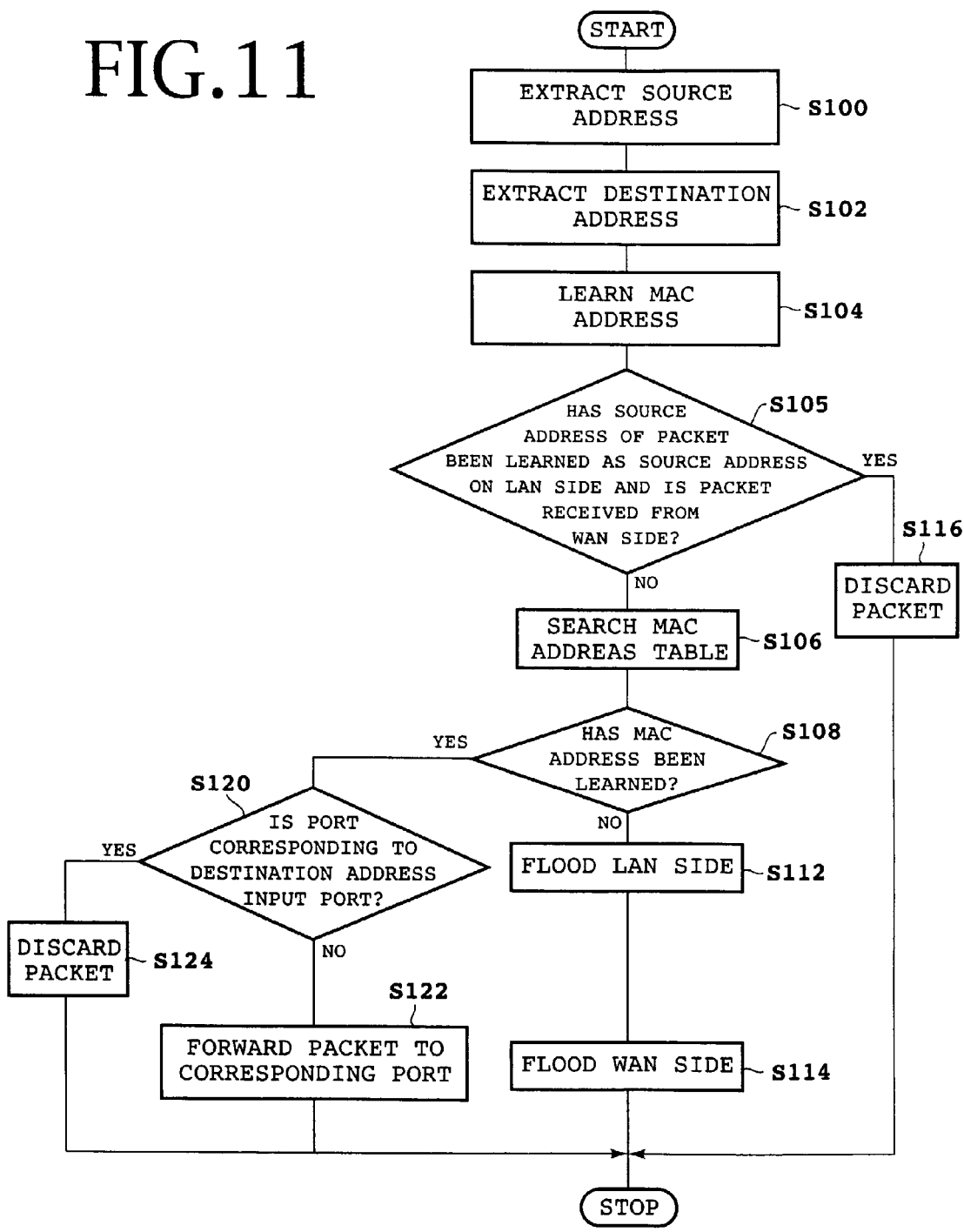
FIG. 11 is a flowchart of operation of an SW unit in FIG. 10.

FIG. 10 is a block diagram of an SW 150#i in FIG. 9. In the figure, substantially the same components as the components in FIG. 3 are identified by the same reference numerals. FIG. 11 is a flowchart of operation of an SW unit 160#i in FIG. 10. The SW unit 160#i receives a packet from a LAN interface unit 70#ij or a WAN interface unit 72#il, and then performs the following processing. Processing of steps S100 to S104, steps S106 to S112, and steps S120 to S124 is the same as processing of the steps S2 to S6, the steps S8 to S12, and the steps S18 to S22 in FIG. 4. At a step S105, the SW unit 160#i determines whether the source address of the packet has been learned as a source address on the LAN side and the packet is received from the WAN 152. When the source address of the packet has not been learned as a source address on the LAN side or the packet is not received from the WAN 152, the processing proceeds to a step S106. When the source address of the packet has been learned as a source address on the LAN side and the packet is received from the WAN 152, the processing proceeds to a step S116. At the step S116, the SW unit 160#i discards the packet. At a step S114, the SW unit 160#i floods the WAN 152 side with the packet. In this case, the step S114 may be carried out after the step S14 in FIG. 4 is carried out.

Figure 12:
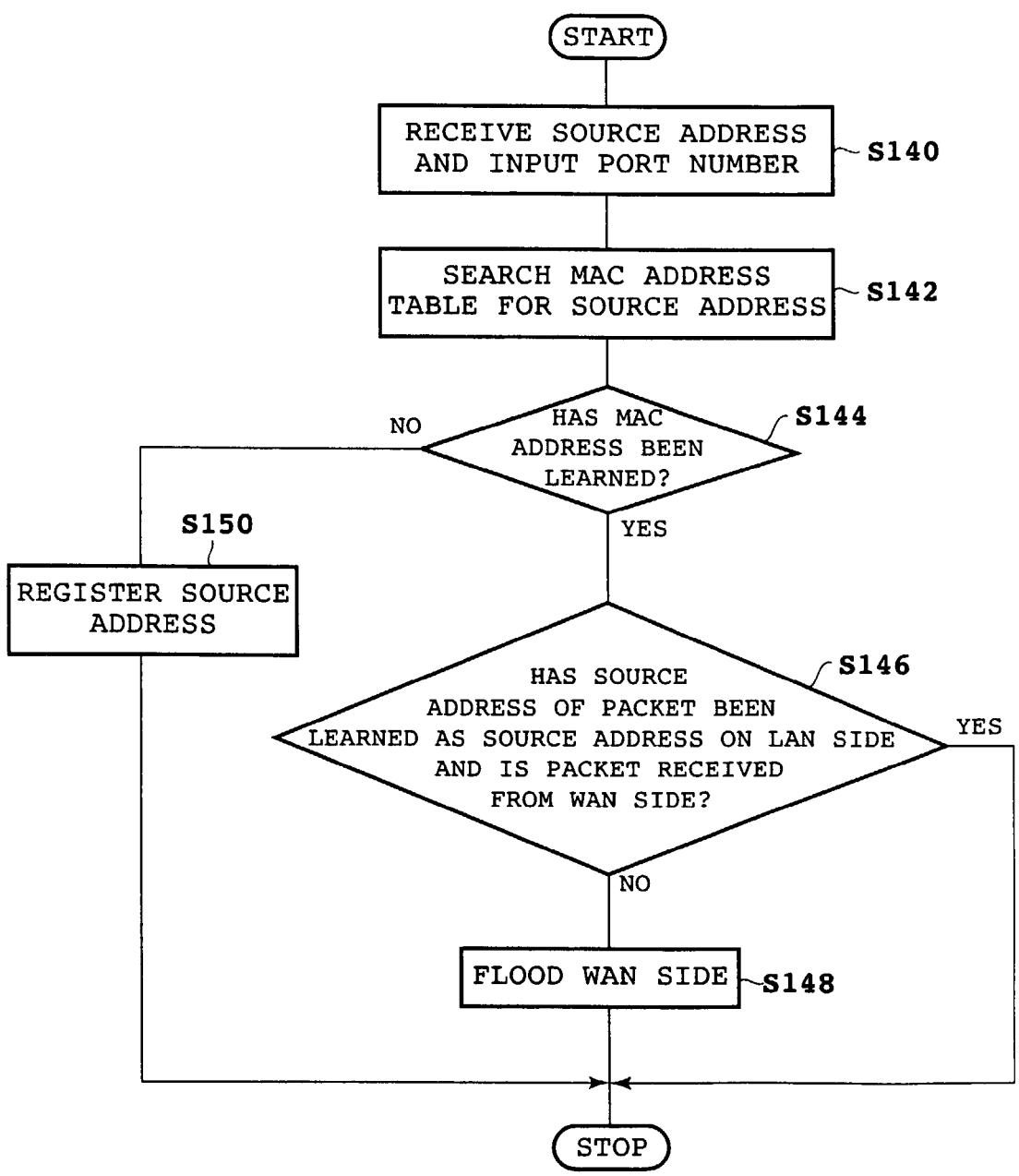
FIG. 12 is a flowchart of operation of a MAC address learning unit in FIG. 10.

FIG. 12 is a flowchart of operation of a MAC address learning unit 162#i in FIG. 10. At a step S140, the MAC address learning unit 162#i receives the source address and an input port number. At a step S142, the MAC address learning unit 162#i searches a MAC address table 78#i for the source address. At a step S144, the MAC address learning unit 162#i determines whether the MAC address has been learned. When the MAC address has been learned, the processing proceeds to a step S146. When the MAC address has not been learned, the processing proceeds to a step S150. At the step S146, the MAC address learning unit 162#i determines whether the source address of the packet has been learned as a source address on the LAN side and the input port of the packet is on the WAN 152 side. When the source address of the packet has been learned as a source address on the LAN side and the input port of the packet is on the WAN 152 side, the MAC address learning unit 162#i ends the processing without learning the source address. When the source address of the packet has not been learned as a source address on the LAN side or the input port of the packet is not on the WAN 152 side, the processing proceeds to a step S148. At the steps S148 and S150, the MAC address learning unit 162#i registers the source address, the input port number, and a present time in the MAC address table 78#i.

Operation of FIG. 9 will be described in the following. Communication within an office LAN 50#1 is the same as in the first embodiment, and therefore its description will be omitted. Communication between the office LAN 50#1 and an office LAN 50#3 will be described. Suppose that a terminal 60#111 sends a packet having the MAC address of the terminal as a source address and the MAC address of a terminal 60#311 as a destination address to the office LAN 50#1. The LAN interface unit 70#11 in the SW 150#1 receives the packet, and then outputs the packet to the SW unit 160#1. As the packet is received from the LAN side, the SW unit 160#1 learns the source address of the packet, and searches the MAC address table 78#1 for the destination address of the packet to determine whether the destination address has been learned. Since the terminal 60#311 is not accommodated in the office LAN 50#1, the SW unit 160#1 forwards the packet to the WAN 152 side. The packet forwarded to the WAN 152 is received by the SW 150#4.

Since the packet is received from the WAN side but the source address of the packet is not learned as a source address on the LAN side, the SW 150#4 learns the source address, and searches the MAC address table 78#4 for the destination address of the packet to determine whether the destination address has been learned. Since the terminal 60#311 is not accommodated in an office LAN 50#4, the SW 150#4 forwards the packet to the WAN 152 side. The packet forwarded to the WAN 152 is received by the SW 150#3. Since the packet is received from the WAN side but the source address of the packet is not learned as a source address on the LAN side, the SW 150#3 learns the source address, and searches the MAC address table 78#3 for the destination address of the packet to determine whether the destination address has been learned. In this case, the terminal 60#311 is accommodated in an office LAN 50#3, and suppose that the address of the terminal 60#311 has not been learned, so that the office LAN 50#3 is flooded with the packet and also the packet is forwarded to the WAN 152 side. The packet forwarded to the WAN 152 is received by the SW 150#2. The SW 150#2 operates in the same manner as the SW 150#4 to forward the packet to the WAN 152 side. The packet forwarded to the WAN 152 is received by the SW 150#1.

Since the packet is received from the WAN side and the source address of the packet is learned as a source address on the LAN side, the SW 150#1 determines that the packet has circulated around. The SW 150#1 therefore does not learn the source address, and discards the packet. Thus, when the source address of the packet received from the WAN 152 side is learned as a source address on the LAN side, the packet is discarded, whereby an increase in the traffic of the WAN 152 due to the unnecessary circulation of the packet is controlled. Incidentally, it is conceivable that the terminal 60#111 is moved to be accommodated in another office LAN. However, this presents no problem in operation because of a short time between when a packet is transmitted from the terminal 60#111 and when the packet circulates around, and because when the terminal 60#111 is accommodated in another office LAN, aging once deletes the address of the terminal 60#111 from the MAC address table 78#1.

Fourth Embodiment

Figure 13:
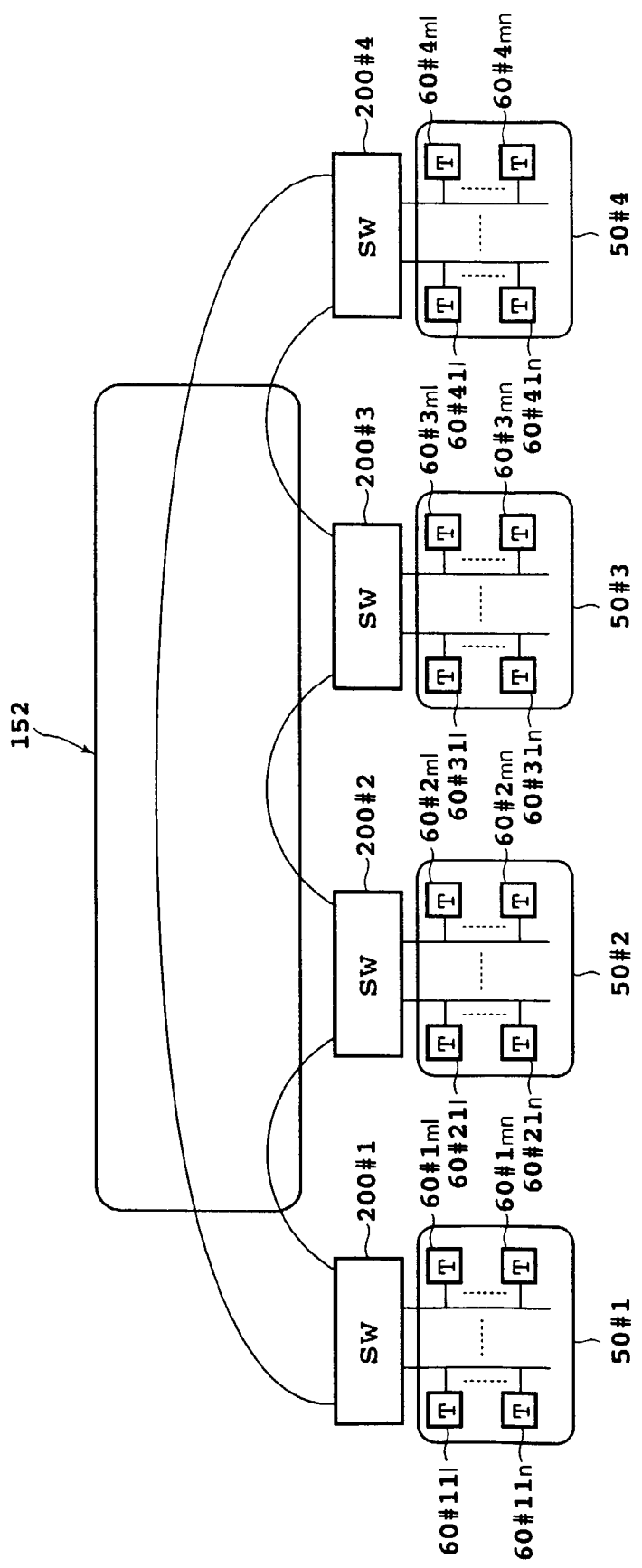
FIG. 13 is a diagram of a network configuration according to a fourth embodiment of the present invention.
Figure 14:
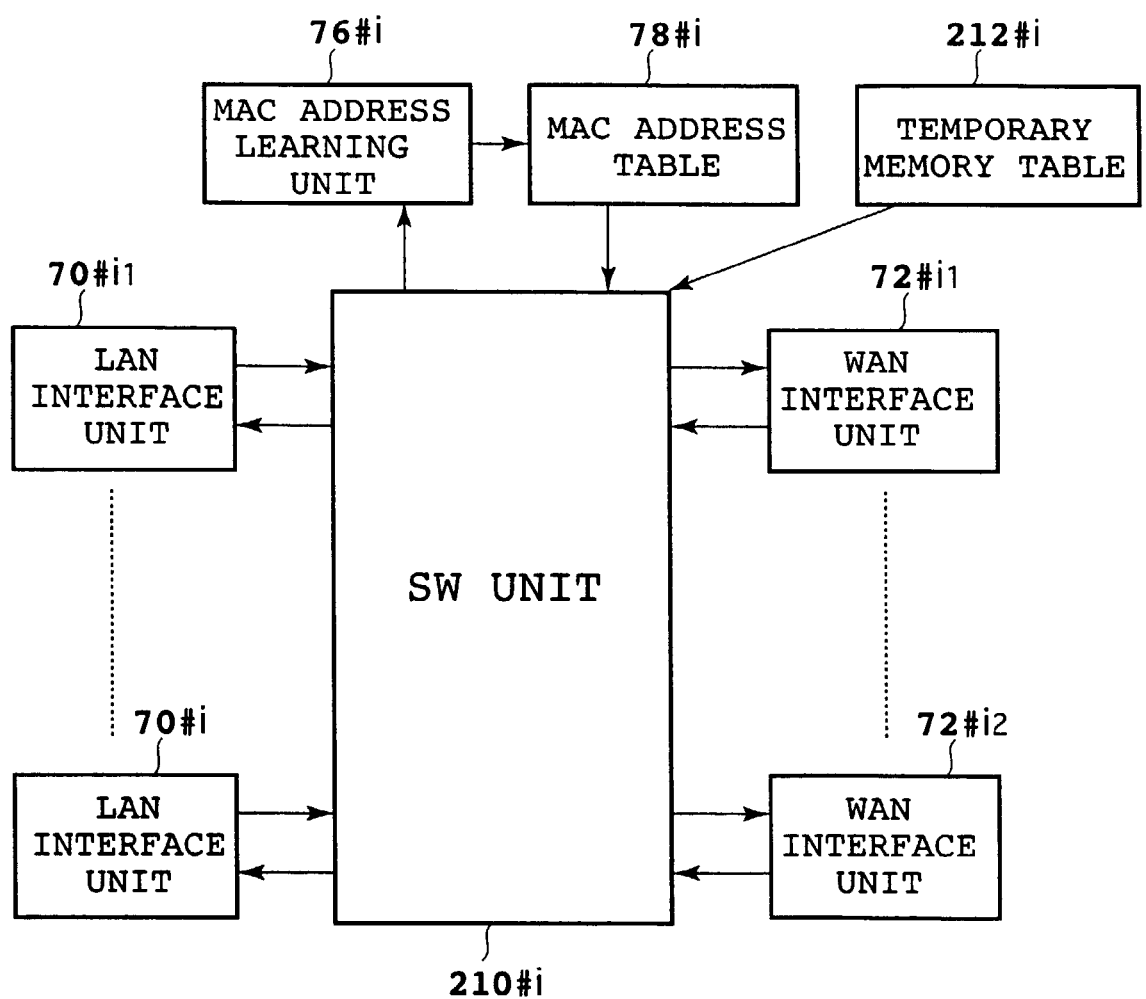
FIG. 14 is a block diagram of an SW in FIG. 13.
Figure 15:
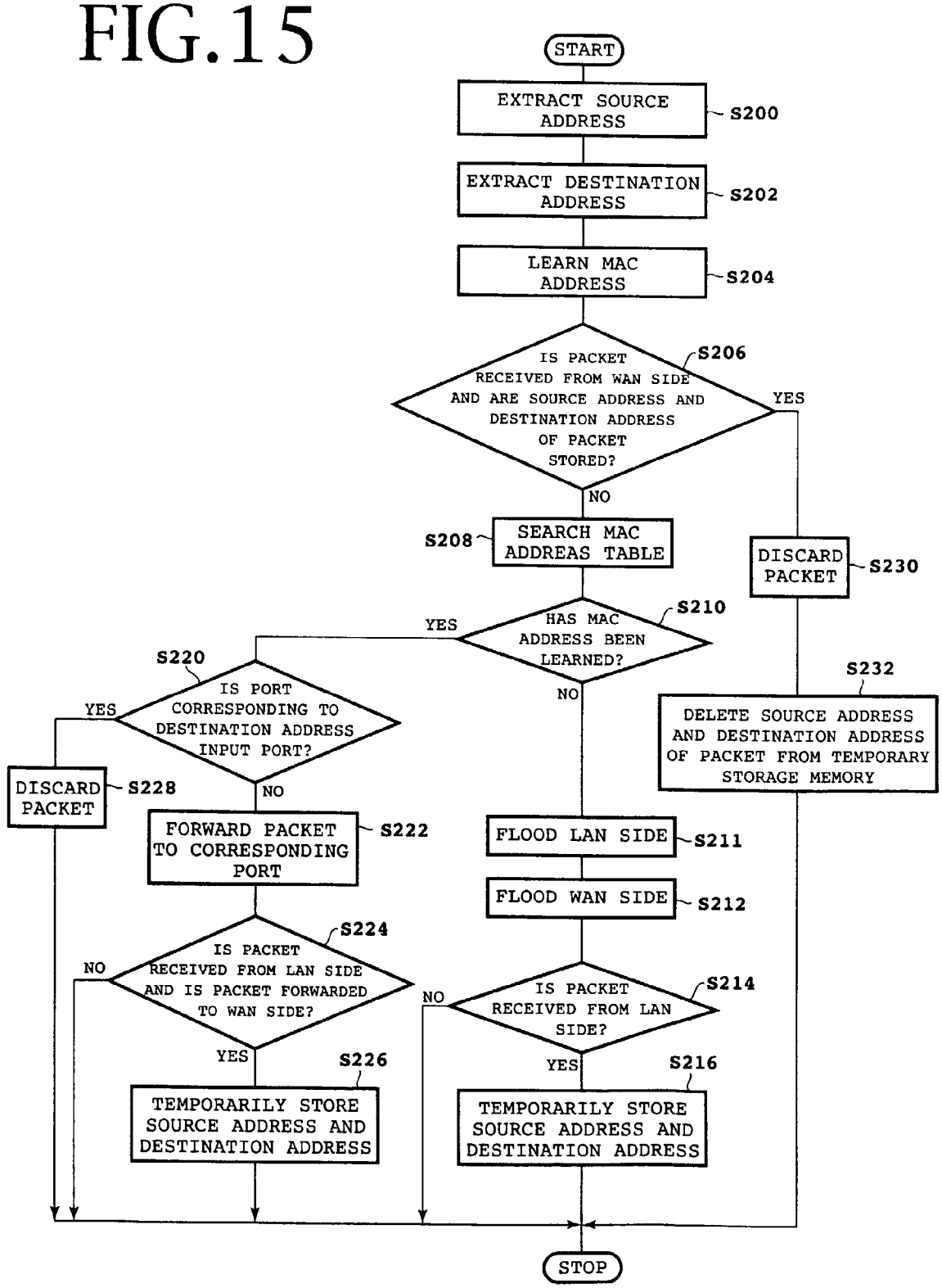
FIG. 15 is a flowchart of operation of an SW unit in FIG. 14.

FIG. 13 is a diagram of a network configuration according to a fourth embodiment of the present invention. In the figure, substantially the same components as the components in FIG. 9 are identified by the same reference numerals. The fourth embodiment is another example than the third embodiment, the example which reduces the traffic of a WAN 152 by discarding a circulating packet. FIG. 14 is a block diagram of an SW 200#i in FIG. 13. In the figure, substantially the same components as the components in FIG. 3 are identified by the same reference numerals. FIG. 15 is a flowchart of operation of an SW unit 210#i in FIG. 14. The SW unit 210#i receives a packet from a LAN interface unit 70#ij or a WAN interface unit 72#ij, and then performs the following processing. Processing of steps S200 to S204, steps S208 to S212, steps S220 to S222, and a step S228 is the same as processing of the steps S100 to S104, the steps S106 to S114, the steps S120 to S122, and the step S124 in FIG. 11.

At a step S206, the SW unit 210#i receives a packet from the WAN 152 side, and determines whether the source address and the destination address of the packet are stored in a temporary memory table 212#i. When the source address and the destination address of the packet are not stored in the temporary memory table 212#i, the processing proceeds to a step S208. When the source address and the destination address of the packet are stored in the temporary memory table 212#i, the processing proceeds to a step S230. At a step S214, the SW unit 210#i determines whether a packet is received from a LAN 50#i side. When the packet is received from the LAN 50#i side, the processing proceeds to a step S216. When the packet is not received from the LAN 50#i side, the processing is ended. At a step S216, the SW unit 210#i stores the source address and the destination address of the packet and a present time in the temporary memory table 212#i. At a step S224, the SW unit 210#i determines whether the packet is received from the LAN 50#i and the packet is forwarded to the WAN 152 side. When the packet is received from the LAN 50#i and the packet is forwarded to the WAN 152 side, the processing proceeds to a step S226. When the packet is not received from the LAN 50#i and the packet is not forwarded to the WAN 152 side, the processing is ended. At a step S226, the SW unit 210#i stores the source address and the destination address of the packet and a present time in the temporary memory table 212#i.

Thus, the source address and the destination address of the packet received from the office LAN 50#i and forwarded to the WAN 152 side are stored in the temporary memory table 212#i. Packets stored in the temporary memory table 212#i are limited to those received from the LAN 50#i because when a series of packets having the same source address and destination address is forwarded to the WAN 152, an SW that relays the packets may discard a second and subsequent packets if the source addresses and the destination addresses of packets received from the WAN 152 are also stored in the temporary memory table 212#i.

At a step S230, the SW unit 210#i discards the packet. The packet is discarded because a packet whose source address and destination address are stored in the temporary memory table 212#i can be considered to be a circulating packet. At a step S232, the SW unit 210#i deletes the source address and the destination address of the packet from the temporary memory table 212#i. Also, the SW unit 210#i refers to the temporary memory table 212#i and deletes from the temporary memory table 212#i a packet whose source address and destination address have been temporarily stored for a certain period of time.

Operation of FIG. 13 will be described in the following. Communication within the office LAN 50#1 is the same as in the first embodiment, and therefore its description will be omitted. Communication between the office LAN 50#1 and the office LAN 50#3 will be described. Suppose that a terminal 60#111 sends a packet having the MAC address of the terminal as a source address and the MAC address of a terminal 60#311 as a destination address to the office LAN 50#1. The LAN interface unit 70#11 in the SW 200#1 receives the packet, and then outputs the packet to the SW unit 210#1. The SW unit 210#1 learns the source address of the packet, and searches a MAC address table 78#1 for the destination address of the packet to determine whether the destination address has been learned. Since the terminal 60#311 is not accommodated in the office LAN 50#1, the SW unit 210#1 forwards the packet to the WAN 152 side. Since the packet is received from the LAN 50#1 in this case, the SW unit 210#1 stores the source address and the destination address of the packet and a present time in the temporary memory table 212#1. The packet forwarded to the WAN 152 is received by the SW 200#4.

The SW 200#4 learns the source address of the packet, and searches a MAC address table 78#4 for the destination address of the packet to determine whether the destination address has been learned. Since the terminal 60#311 is not accommodated in the office LAN 50#4, the SW 200#4 forwards the packet to the WAN 152 side. The packet forwarded to the WAN 152 is received by the SW 200#3. The SW 200#3 learns the source address of the packet, and searches a MAC address table 78#3 for the destination address of the packet to determine whether the destination address has been learned. In this case, the terminal 60#311 is accommodated in the office LAN 50#3, and suppose that the address of the terminal 60#311 has not been learned, so that the office LAN 50#3 is flooded with the packet and also the packet is forwarded to the WAN 152 side. The packet forwarded to the WAN 152 is received by the SW 200#2. The SW 200#2 operates in the same manner as the SW 200#4 to forward the packet to the WAN 152 side. The packet forwarded to the WAN 152 is received by the SW 200#1.

Since the source address and the destination address of the packet are stored in the temporary memory table 212#1, the SW 200#1 determines that the packet has circulated around. The SW 200#1 therefore discards the packet. Thus, when the source address and the destination address of the packet received from the WAN 152 side are stored in the temporary memory table 212#1, the packet is discarded, whereby an increase in the traffic of the WAN 152 due to the unnecessary circulation of the packet is controlled. The source address and the destination address stored in the temporary memory table 212#1 are deleted when the circulating packet is discarded or when a certain time has passed. It is to be noted that while the fourth embodiment determines whether a packet is a circulating packet on the basis of the source address and the destination address of the packet, whether a packet is a circulating packet may be determined on the basis of a CRC set at the rear of a MAC frame.

Fifth Embodiment

Figure 16:
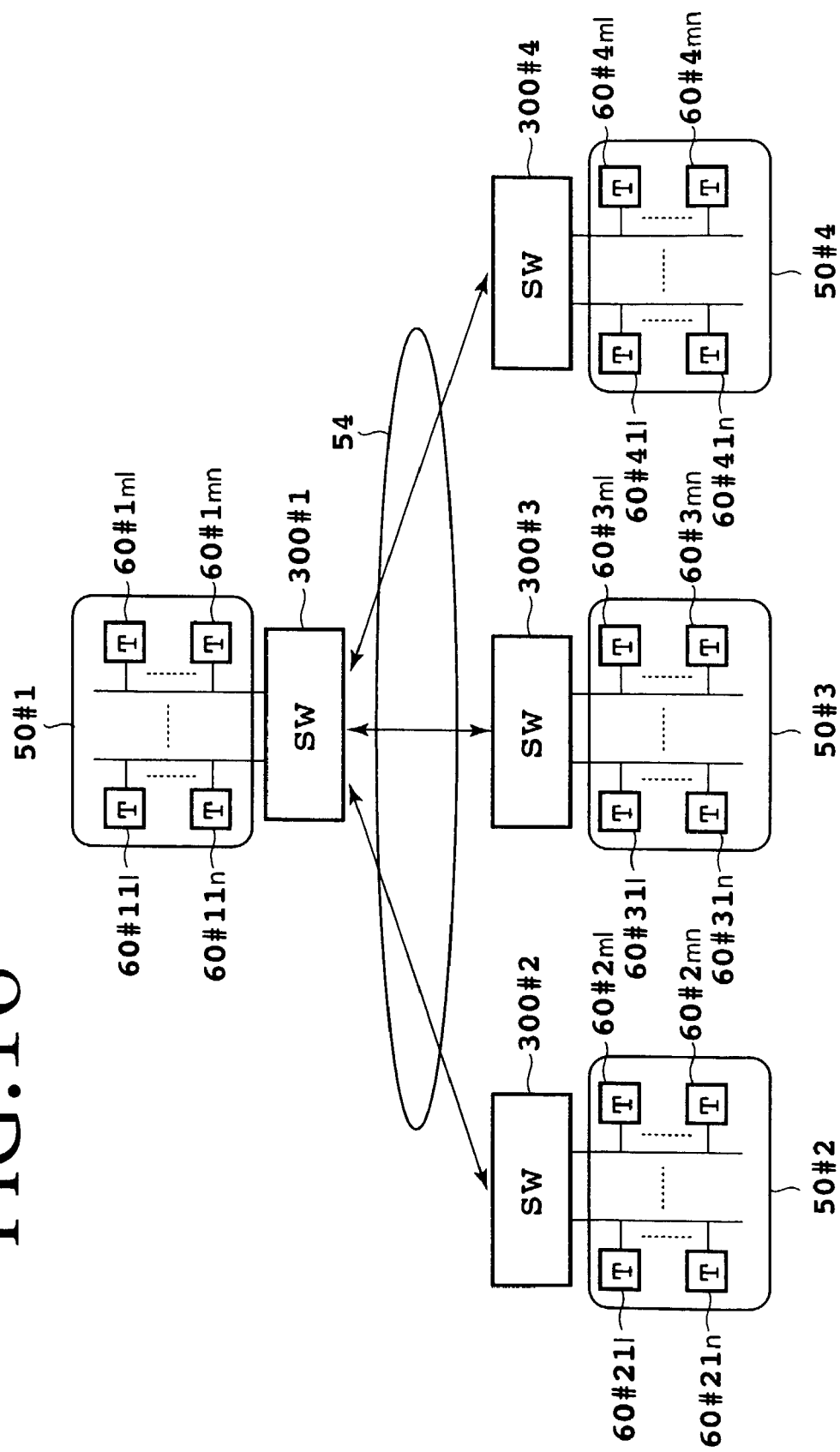
FIG. 16 is a diagram of a network configuration according to a fifth embodiment of the present invention.
Figure 17:
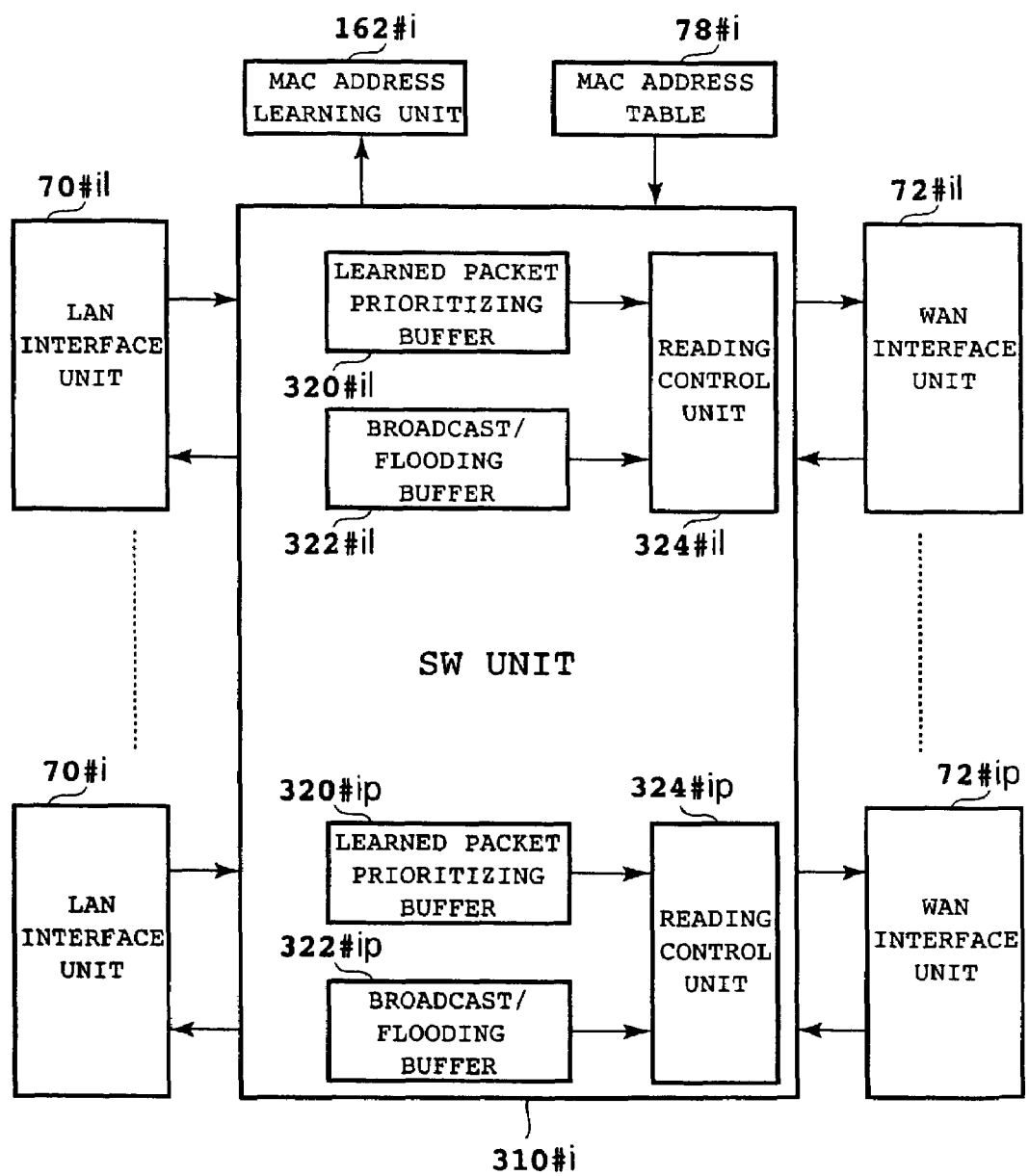
FIG. 17 is a block diagram of an SW in FIG. 16.
Figure 18:
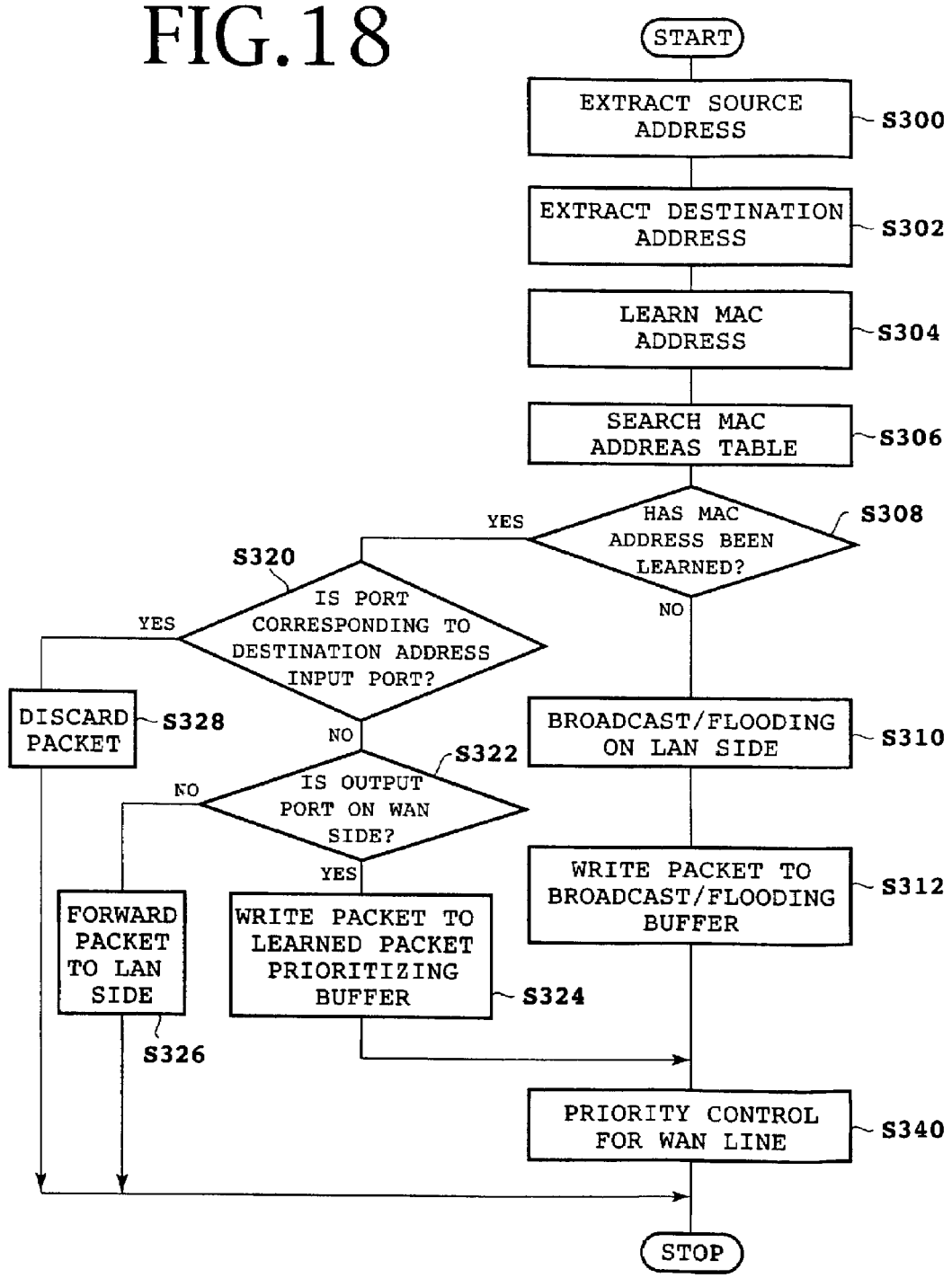
FIG. 18 is a flowchart of operation of an SW unit in FIG. 17.
Figure 19:
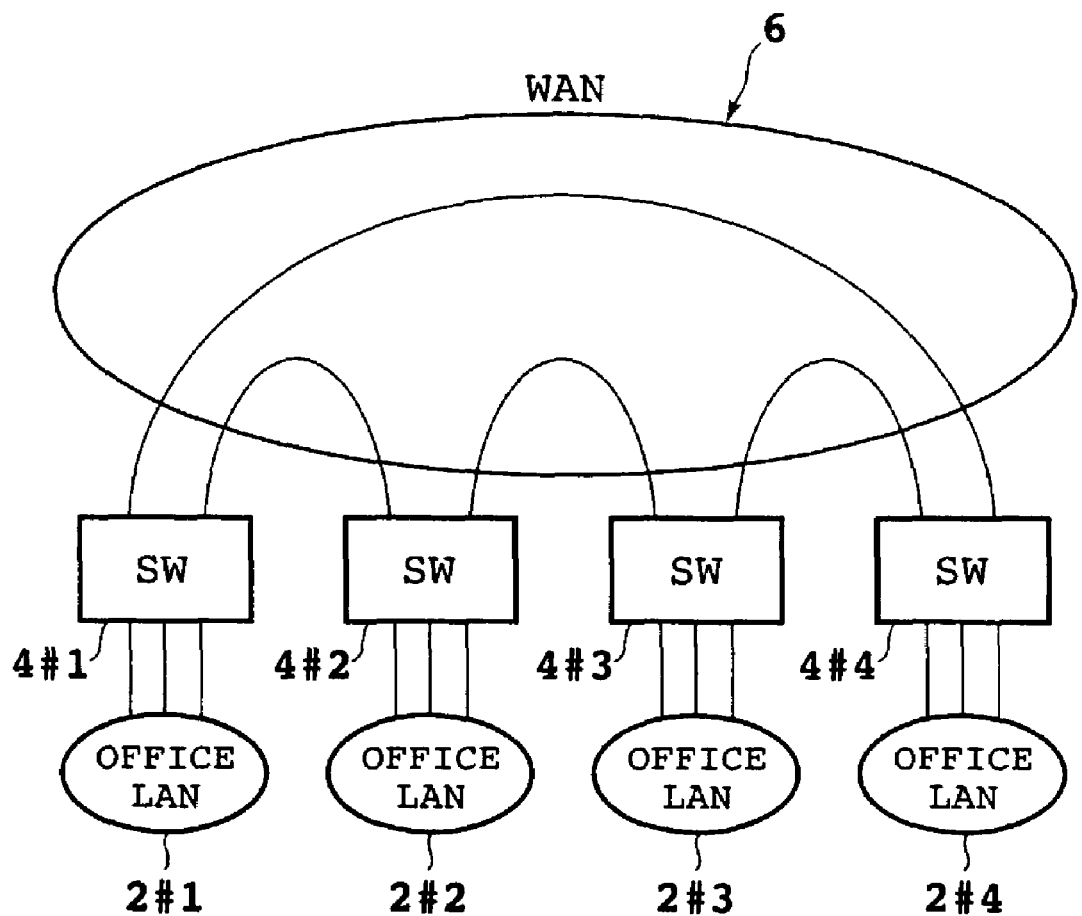
FIG. 19 is a diagram of a conventional network configuration.

FIG. 16 is a diagram of a network configuration according to a fifth embodiment of the present invention. In the figure, substantially the same components as the components in FIG. 2 are identified by the same reference numerals. FIG. 17 is a block diagram of an SW 300#i in FIG. 16. In the figure, substantially the same components as the components in FIG. 3 are identified by the same reference numerals. FIG. 18 is a flowchart of operation of an SW unit 310#i in FIG. 17. The SW unit 310#i receives a packet from a LAN interface unit 70#ij or a WAN interface unit 72#ij, and then performs the following processing. Processing of steps S300 to S308, a step S320, and a step S328 is the same as processing of the steps S2 to S10, the step S18, and the step S22 in FIG. 4. At a step S310, the SW unit 310#i performs flooding or broadcast to a LAN 50#i side. At a step S312, the SW unit 310#i writes the packet to a broadcast/flooding buffer, and then the processing proceeds to a step S340.

At a step S322, the SW unit 310#i determines whether the output port is on a WAN 54 side. When the output port is on the WAN 54 side, the processing proceeds to a step S324. When the output port is on the LAN 50#i side, the processing proceeds to a step S326. At the step S324, the SW unit 310#i writes the packet to a learned packet prioritizing buffer, and then the processing proceeds to a step S340. At the step S326, the SW unit 310#i forwards the packet to the LAN 50#i side. At the step S340, the SW unit 310#i first reads a packet written in the learned packet prioritizing buffer before a packet is writtenin the broadcast/flooding buffer, and then performs broadcast/flooding on the WAN 54 side. Not only packets for flooding but also broadcast packets are not given priority because it may be considered that broadcast packets are often used as control packets and are not required to have a real time characteristic as against normal packets that constitute real traffic. Thus, learned normal packets are forwarded first to thereby control an increase in the traffic.

A learned packet prioritizing buffer 320#il is provided for each WAN interface unit 72#il, and stores a packet whose destination address has been learned. A broadcast/flooding buffer 322#il is provided for each WAN interface unit 72#il, and stores a packet for broadcast/flooding whose destination address has not been learned. A reading control unit 324#il reads a packet written in the learned packet prioritizing buffer 320#il before a packet is written in the broadcast/flooding buffer 322#il, in order to control an increase in the traffic to be caused by a packet for broadcast/flooding on the WAN 54 side.

Operation of FIG. 16 will be described in the following. Communication within the office LAN 50#1 is the same as in the first embodiment, and therefore its description will be omitted. Communication between the office LAN 50#1 and the office LAN 50#3 will be described. Suppose that a terminal 60#111 sends a packet having the MAC address of the terminal as a source address and the MAC address of a terminal 60#311 as a destination address to the office LAN 50#1. The LAN interface unit 70#11 in the SW 300#1 receives the packet, and then outputs the packet to the SW unit 310#1. The SW unit 310#1 learns the source address of the packet, and searches a MAC address table 78#1 for the destination address of the packet to determine whether the destination address has been learned.

When the destination address has been learned, the packet is written to the learned packet prioritizing buffer provided for the WAN interface unit corresponding to the destination address, and then forwarded to the WAN 54 side before a packet is written in the broadcast/flooding buffer. When the destination address has not been learned, the packet is written to the broadcast/flooding buffers provided for all WAN interface units, and then forwarded to the WAN 54 side after a packet is written in the learned packet prioritizing buffers. Thus, a packet for flooding and a packet for broadcast used as a control packet are not given forwarding priority. It is therefore possible to control an increase in the traffic of the WAN 54. The present invention described above can control an increase in traffic due to flooding or broadcast on the WAN side.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A packet switch for interfacing between a WAN and a LAN accommodating a terminal, said packet switch comprising:
    a plurality of LAN interface units for interfacing with said LAN;
    an address table for storing a relation between an address of the terminal and an input port receiving a packet transmitted from the terminal;
    an address learning unit for storing in said address table the relation between the source address of the received packet and the input port receiving the received packet; and
    an SW unit for effecting control to receive a packet transmitted from a terminal accommodated in said LAN and received by a first LAN interface unit of said plurality of LAN interface units, and transmit the received packet to a corresponding output port according to a relation between a destination address of the received packet and the input port when the destination address is stored in said address table, and effecting control to transmit the received packet to the LAN through all of the LAN interface units different from the first LAN interface unit when the destination address of the received packet is not stored in said address table, and then transmit the received packet to the WAN when a packet having a source address identical with the destination address of the received packet has not been received from the LAN in a certain time after transmitting the received packet to the LAN.

2. A packet switch as claimed in claim 1, further including a plurality of output ports for interfacing the WAN,
    wherein when the received packet is transmitted to the WAN, said SW unit selects one of said plurality of output ports and transmits the received packet from the selected output port, and when a packet having a source address identical with the destination address of the received packet has not been received from the WAN in a certain time after transmitting the received packet from the selected output port, said SW unit effects control to transmit the received packet from another output port connected to the WAN.

3. A packet switch for interfacing between a WAN and a LAN accommodating a terminal, said packet switch comprising:
    an address table for storing a correspondence between an address of the terminal and an input port receiving a packet transmitted from the terminal;
    an address learning unit for not storing in said address table a source address of a packet received from the WAN when the source address is stored in said address table and an input port corresponding to the source address is on the LAN side, and otherwise storing in said address table a relation between a source address of a packet received from the LAN or the WAN and an input port receiving the packet;
    an aging processing unit for deleting each of the addresses from said address table when there has been no update relating to the address in a certain time; and
    an SW unit for effecting control to transmit the packet received from the LAN side to a corresponding output port according to a relation between a destination address of the packet and the input port when the destination address is stored in said address table, and discarding the packet received from the WAN side when the source address of the packet is stored in said address table and the input port corresponding to the source address of the packet is on the LAN side.

4. A packet switch for interfacing between a WAN and a LAN accommodating a terminal, said packet switch comprising:
    an address table for storing a relation between an address of the terminal and an input port receiving a packet transmitted from the terminal;
    an address learning unit for storing in said address table a relation between a source address of a packet received from the LAN or the WAN and an input port receiving the packet;
    a temporary storage memory; and
    an SW unit for effecting control to transmit the packet to a corresponding output port according to a relation between a destination address of the packet and the input port when the destination address of the packet is stored in said address table, storing information on a received packet received from the LAN in said temporary storage memory when the received packet is transmitted to the WAN, and discarding a received packet received from the WAN side when information on the received packet coincides with the information stored in said temporary storage memory.

5. A packet switch as claimed in claim 4,
    wherein the information on the received packet is a source address and a destination address of the received packet.

6. A packet switch as claimed in claim 4,
    wherein the information on the received packet is error-detecting data of the received packet.

7. A packet switch for interfacing between a WAN and a LAN accommodating a terminal, said packet switch comprising:
    a plurality of LAN interface units for interfacing with said LAN;
    an address table for storing a relation between an address of the terminal and an input port receiving a packet transmitted from the terminal;
    an address learning unit for storing in said address table the relation between the source address of the received packet and the input port receiving the received packet;
    a first buffer and a second buffer for storing received packets received by said plurality of LAN interface units provided for each of output ports connected to the WAN;
    an SW unit for writing the received packet to said first buffer provided for the output port connected to the WAN side when a destination address of the received packet is stored in said address table and when a corresponding output port according to a relation between the destination address and the input port is connected to the WAN side, and effecting control to transmit the received packet to the LAN through all of the LAN interface units different from the LAN interface unit which has received the received packet and writing the received packet to said second buffer provided for all of the output ports connected to the WAN side when the destination address of the received packet is not stored in said address table; and a priority control unit for preferentially reading the packet written to said first buffer to reading the packet written to said second buffer and transmitting the packet written to said first buffer to the WAN side.

* * * * *